US011842540B2

(12) United States Patent
Ben Yahia et al.

(10) Patent No.: US 11,842,540 B2
(45) Date of Patent: Dec. 12, 2023

(54) ADAPTIVE USE OF VIDEO MODELS FOR HOLISTIC VIDEO UNDERSTANDING

(71) Applicant: QUALCOMM Incorporated, San Diego, CA (US)

(72) Inventors: Haitam Ben Yahia, Diemen (NL); Amir Ghodrati, Amsterdam (NL); Mihir Jain, Amsterdam (NL); Amirhossein Habibian, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 274 days.

(21) Appl. No.: 17/219,460

(22) Filed: Mar. 31, 2021

(65) Prior Publication Data

US 2022/0318553 A1   Oct. 6, 2022

(51) Int. Cl.
| | |
|---|---|
| *G06V 20/00* | (2022.01) |
| *G06V 20/40* | (2022.01) |
| *G06V 10/40* | (2022.01) |
| *G06N 3/08* | (2023.01) |
| *G10L 25/57* | (2013.01) |
| *G06F 18/21* | (2023.01) |
| *G06N 3/045* | (2023.01) |

(52) U.S. Cl.
CPC .............. *G06V 20/41* (2022.01); *G06F 18/21* (2023.01); *G06N 3/045* (2023.01); *G06N 3/08* (2013.01); *G06V 10/40* (2022.01); *G06V 20/46* (2022.01); *G10L 25/57* (2013.01)

(58) Field of Classification Search
CPC ........ G06V 20/41; G06V 10/40; G06V 20/46; G06V 10/7715; G06V 10/87; G06V 20/40; G06F 18/21; G06N 3/045; G06N 3/08; G10L 25/57
See application file for complete search history.

(56) References Cited

U.S. PATENT DOCUMENTS

2018/0144194 A1   5/2018  Park
2020/0097723 A1*  3/2020  Ebrahimpour ....... G06V 10/764
(Continued)

FOREIGN PATENT DOCUMENTS

CN         102982351 A  *  3/2013

OTHER PUBLICATIONS

Jiang et al Comprehensive Video Understanding: Video Summarization with Content-Based Video Recommender Design, 2019 IEEE/CVF International Conference on Computer Vision Workshop (ICCVW), pp. 1562-1569 (Year: 2019).*
(Continued)

*Primary Examiner* — Ping Y Hsieh
*Assistant Examiner* — Xiao Liu
(74) *Attorney, Agent, or Firm* — Polsinelli/Qualcomm

(57) ABSTRACT

Systems and techniques are provided for performing holistic video understanding. For example a process can include obtaining a first video and determining, using a machine learning model decision engine, a first machine learning model from a set of machine learning models to use for processing at least a portion of the first video. The first machine learning model can be determined based on one or more characteristics of at least the portion of the first video. The process can include processing at least the portion of the first video using the first machine learning model.

30 Claims, 13 Drawing Sheets

(56) References Cited

U.S. PATENT DOCUMENTS

| | | | |
|---|---|---|---|
| 2020/0118037 A1* | 4/2020 | Horikawa | G06V 10/87 |
| 2020/0202167 A1* | 6/2020 | Gross | G06N 3/045 |
| 2021/0304400 A1* | 9/2021 | Bhate | G06F 18/2148 |

OTHER PUBLICATIONS

Tian et al., MCA-NN: Multiple Correspondence Analysis Based Neural Network for Disaster Information Detection, 2017 IEEE Third International Conference on Multimedia Big Data (BigMM), pp. 268-275 (Year: 2017).*
Wang et al, Non-local Neural Networks, CVPR (Year: 2018).*
Kuang et al, Improved actor relation graph based group activity recognition, arXiv:2010.12968 (Year: 2020).*
Javidani et al Learning representative temporal features for action recognition, arXiv1802.06724v1 (Year: 2018).*
Dizaji et al, 3D InspectionNet: a deep 3D convolutional neural networks based approach for 3D defect detection on concrete columns, Proc. Nondestructive Characterization and Monitoring of Advanced Materials, Aerospace, Civil Infrastructure, and Transportation XIII, Vol. 09710E (Year: 2019).*
International Search Report and Written Opinion—PCT/US2022/014137—ISA/EPO—dated May 13, 2022.

\* cited by examiner

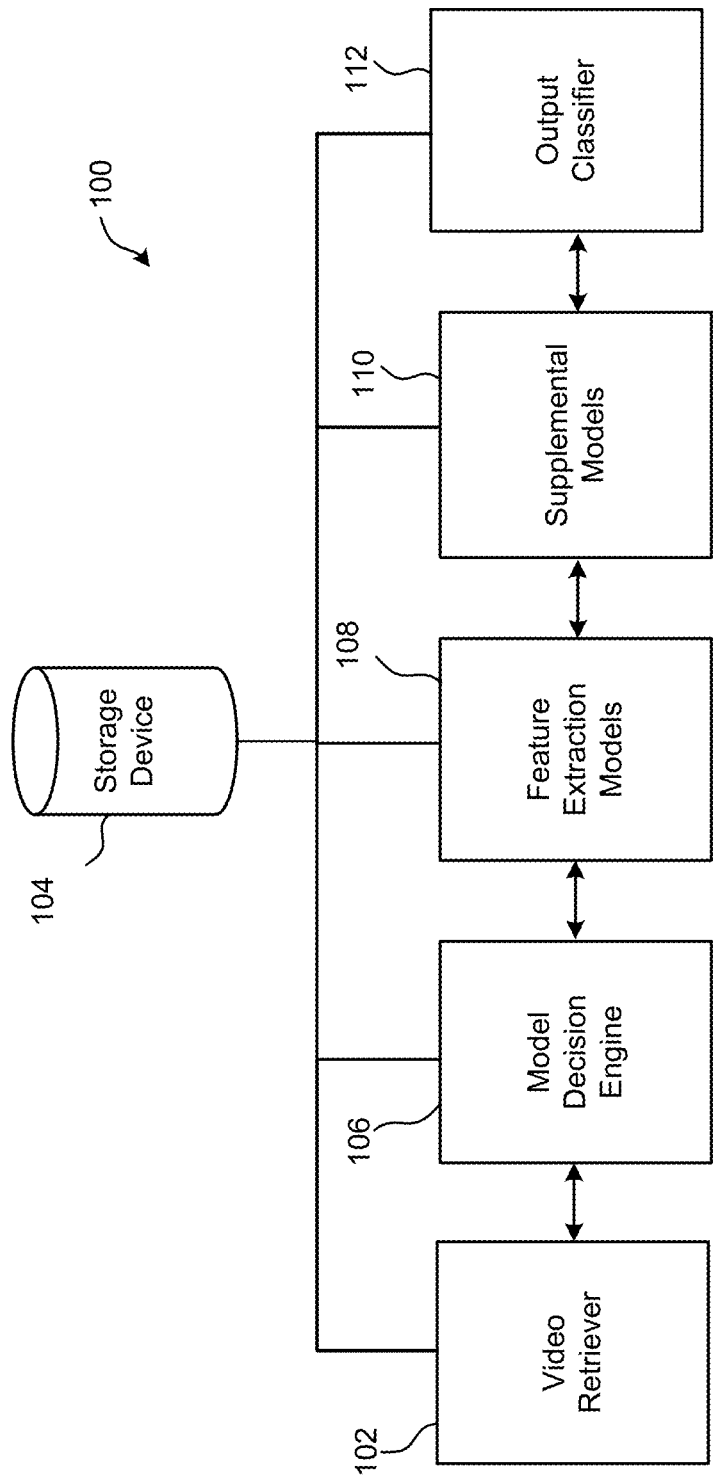

ADAPTIVE USE OF VIDEO MODELS FOR HOLISTIC VIDEO UNDERSTANDING

FIELD

The present disclosure generally relates to models for understanding video content. In some examples, aspects of the present disclosure are related to systems and techniques for selection of machine learning models based on characteristics of video content.

BACKGROUND

Many machine learning models are available for analyzing and categorizing information contained in video data (or sequences of image frames). In order to obtain a holistic understanding of information contained in video data, the video data should be understood across various categories, such as actions, attributes, events, objects, scenes, among others. Machine learning models that are trained to detect actions (e.g., three-dimensional (3D) convolutional neural networks (CNNs), optical flow neural networks, etc.) may be excessively computationally intensive when applied to video data that contains few actions. On the other hand, computationally efficient machine learning models that are well suited to detect objects in static video scenes may be unable to adequately detect actions in videos containing significant motion. In some cases, it is desirable to have a machine learning model that is capable of performing holistic understanding of video across multiple categories in as efficient of a manner as possible.

BRIEF SUMMARY

In some examples, systems and techniques are described for adaptively selecting between video processing models for holistic video understanding. According to at least one illustrative example, a method of processing video data is provided. The method includes: obtaining a first video; determining, using a machine learning model decision engine, a first machine learning model from a set of machine learning models, the first machine learning model being determined based on one or more characteristics of at least a portion of the first video; and processing at least the portion of the first video using the first machine learning model.

In another example, an apparatus for processing video data is provided that includes a memory configured to store at least one video or a portion of a video and one or more processors (e.g., implemented in circuitry) coupled to the memory. The one or more processors are configured to and can: obtain a first video; determine, using a machine learning model decision engine, a first machine learning model from a set of machine learning models, the first machine learning model being determined based on one or more characteristics of at least a portion of the first video; and process at least the portion of the first video using the first machine learning model.

In another example, a non-transitory computer-readable medium is provided that has stored thereon instructions that, when executed by one or more processors, cause the one or more processors to: obtain a first video; determine, using a machine learning model decision engine, a first machine learning model from a set of machine learning models, the first machine learning model being determined based on one or more characteristics of at least a portion of the first video; and process at least the portion of the first video using the first machine learning model.

In another example, an apparatus for processing video data is provided. The apparatus includes: means for obtaining a first video; means for determining, using a machine learning model decision engine, a first machine learning model from a set of machine learning models, the first machine learning model being determined based on one or more characteristics of at least a portion of the first video; and means for processing at least the portion of the first video using the first machine learning model.

In some aspects, the method, apparatuses, and computer-readable medium described above further comprise determining a classification of at least the portion of the first video based on processing at least the portion of the first video using the first machine learning model.

In some aspects, the method, apparatuses, and computer-readable medium described above further comprise extracting, using the first machine learning model, first one or more features from at least the portion of the first video; processing, using a first supplemental model, the first one or more features; and determining, based on processing the first one or more features using the first supplemental model, a first classification of at least the portion of the first video. In some cases, the first supplemental model includes a neural network. In some cases, the first supplemental model includes a one-dimensional convolutional neural network. In such cases, the first one or more features includes a first feature vector based on a first frame of at least the portion of the first video and a second feature vector based on a second frame of at least the portion of the first video. In such cases, the first supplemental model generates temporal information of at least the portion of the first video from at least the first feature vector and the second feature vector. In some cases, the first supplemental model includes a multi-layer perceptron. In some cases, the first supplemental model includes a graph convolutional network.

In some aspects, the method, apparatuses, and computer-readable medium described above further comprise determining, using the machine learning model decision engine, a second machine learning model from the set of machine learning models, the second machine learning model being determined based on one or more characteristics of at least another portion of the first video; and processing the at least another portion of the first video using the second machine learning model. In some aspects, the second machine learning model includes a neural network.

In some aspects, the method, apparatuses, and computer-readable medium described above further comprise extracting, using the second machine learning model, second one or more features from the at least another portion of the first video; processing, using a second supplemental model, the second one or more features; and determining, based on processing the second one or more features using the second supplemental model, a second classification of the at least another portion of the first video.

In some aspects, the first machine learning model includes a neural network. In some aspects, the first machine learning model includes a two-dimensional convolutional neural network. In some cases, the two-dimensional convolutional neural network extracts first one or more features from at least the portion of the first video in two spatial dimensions.

In some aspects, the first machine learning model includes a three-dimensional (3D) CNN. In some cases, the 3D CNN extracts first one or more features from at least the portion of the first video in two spatial dimensions and a temporal dimension.

In some aspects, the method, apparatuses, and computer-readable medium described above further comprise obtaining a second video; determining, using the machine learning model decision engine, a second machine learning model from a set of machine learning models, the second machine learning model being determined based on one or more characteristics of at least a portion of the second video; and processing at least the portion of the second video using the second machine learning model.

In some aspects, the machine learning model decision engine shares a common neural network with the first machine learning model. In some aspects, the method, apparatuses, and computer-readable medium described above further comprise extracting, using the first machine learning model, first one or more features from at least the portion of the first video in parallel with determining the first machine learning model from the set of machine learning models to use for processing at least the portion of the first video.

In some aspects, the one or more characteristics of at least the portion of the first video includes spatial and temporal characteristics.

In some aspects, the one or more characteristics of at least the portion of the first video includes audio characteristics.

In some aspects, one or more of the apparatuses described above can include or be part of a mobile device (e.g., a mobile telephone or so-called "smart phone" or other mobile device), a wearable device, an extended reality device (e.g., a virtual reality (VR) device, an augmented reality (AR) device, or a mixed reality (MR) device), a vehicle (e.g., a computing device of a vehicle), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures:

FIG. 1 is a block diagram illustrating an example holistic video understanding system, in accordance with some examples;

DETAILED DESCRIPTION

Figure 2C:
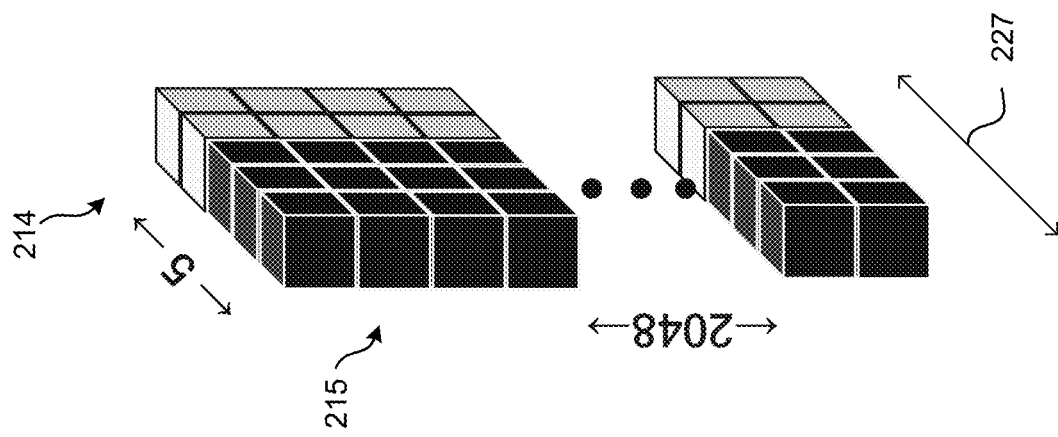
FIG. 2A-FIG. 2D are diagrams illustrating example operations of one-dimensional convolution filters, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the application as set forth in the appended claims.

Machine learning models can be used for processing and/or analyzing video data. Video understanding using machine deep learning systems can be challenging in many cases. For instance, video data includes of a large number of interconnected categories of information, such as objects, actions, events, attributes, concepts, and scenes. These categories can be highly interconnected, which can make it difficult for a machine learning model to perform certain functions. For instance, machine learning models may not be able to perform action classification without recognizing objects, because actions often involve objects. As an example, a machine learning model may be used to distinguish between playing piano versus playing guitar. The motion of playing changes depending on the type of object (e.g., strumming the guitar versus striking keys of the piano), demonstrating that the action and the object are interconnected. For any particular video, one or more of the categories associated with the video may be more important than the others for understanding the video content. In one example, in a video that depicts a static scene, recognizing objects can be more important than detecting actions. In another example, in a video that depicts a sporting event with a moving camera following the action, recognizing actions as well as recognizing objects as they move can be equally important.

A machine learning model may have prior knowledge of important categories present in a video dataset that the machine learning model will process. Based on the prior knowledge, the machine learning model can be designed specifically to efficiently process that dataset. For example, a three dimensional (3D) convolutional neural network (CNN) that analyzes video over two spatial dimensions and a temporal dimension can be optimized using such prior knowledge to reduce compute costs while detecting actions in various types of videos that have dynamic content (e.g., videos of sports matches, concerts, etc.). However, processing a video that depicts a static scene through a 3D CNN can incur significant compute costs (e.g., a large number of floating point operations (FLOPs)) that may not be necessary given the content. This additional compute cost can come as a result of the 3D convolutional network performing certain functions (e.g., convolutions) over multiple frames simultaneously, which may not be needed when objects in a scene are not moving between frames.

A two dimensional (2D) CNN can recognize objects in a video based on a single video frame, rather than performing functions across multiple frames simultaneously, and as a result can be more efficient at identifying objects in one or more video frames. However, because the 2D CNN does not operate on multiple frames captured at different times, the 2D CNN will not return any temporal information indicating how objects within the scene move over time. For instance, the 2D CNN by itself may not be well suited to detecting actions (e.g., occurring across multiple video frames).

Various approaches may be used to overcome the limitation that 2D CNNs produce only spatial information for individual frames. In one example, a one-dimensional (1D) convolution can be used as a supplemental model to the 2D CNN. The 1D convolution can be used to generate temporal information from the features generated by the 2D CNN across consecutive frames. In another example, a non-local neural network with a forward skip can be used to detect temporal relationships between features generated by the 2D CNN across non-consecutive frames. In another example, a graph convolutional network can be used as a supplemental model to the 2D CNN. The graph convolutional network can be used to generate relationships between concepts in a video based on the spatial features generated by the 2D CNN.

If the most important categories are known for a particular video dataset, it may be efficient to design machine learning models (e.g., neural networks) that are specifically catered toward the particular category. However, in order to analyze a video dataset that includes a variety of videos having different characteristics and containing different categories of information within them, relying on a single model may result in excess computational effort (e.g., where the model performs computations attempting to detect categories that are not present in a sample video), poor accuracy (e.g., where the model is not well suited to detecting one or more of the categories of information present in the sample video), or both. When a new dataset is encountered that does not fit the model (e.g., because the model was not trained to understand the type of content in the new dataset), a new targeted model can be developed to solve the new problem presented by the new dataset. However, developing new models can be costly in terms of constantly having to develop new models. Developing new models may also not actually address the issue of holistic video understanding, such as when a newly developed model is designed to solve a narrow problem or understand videos containing a distinct category or categories of information.

Table 1 below illustrates the relative performance of five different video understanding models expressed in units of mean Average Precision (mAP). The content in Table 1 provides an example illustrating the consequences of choosing one model over another for a video. In Table 1, the mAP values of five different machine learning models (models 1-5) are shown for the categories of Action, Attribute, Concept, Event, Object, and Scene. In some examples, machine learning models can apply a particular inductive bias, which can be a prior assumption that restricts the model function by limiting the search space of the model. In Table 1, the model or models (e.g., model 2 and model 4 have similar values for the category "Events") with the highest mAP in each category are underlined. As shown, no single model has the highest accuracy among all of the categories. As a result, a fixed application of any one of the models in Table 1 to a video dataset that contains video data encompassing multiple relevant categories will not achieve optimal accuracy for that video dataset.

TABLE 1

| Model | Average | Action | Attribute | Concept | Event | Object | Scene | Inductive Bias |
|---|---|---|---|---|---|---|---|---|
| 1 | 39.6 | 50.1 | 33.8 | 26.5 | 39.2 | 33.1 | 55.2 | — |
| 2 | 51.5 | 51.1 | 44.0 | 51.8 | 57.3 | 51.3 | 53.5 | Non Local Attention |
| 3 | 52.0 | 51.8 | 45.7 | 51.9 | 56.1 | 53.2 | 53.4 | 1D Conv |
| 4 | 52.2 | 51.8 | 45.3 | 52.2 | 57.4 | 52.4 | 54.0 | Graph Conv |
| 5 | 46.7 | 63.5 | 35.3 | 44.8 | 50.3 | 42.7 | 43.4 | 3D Conv |

In one illustrative example, the first model is HATNet as described in Ali Diba et al., "Large scale holistic video understanding," 2020, which is hereby incorporated by reference in its entirety and for all purposes. In another illustrative example, the second, third, and fourth models share a common 2D CNN as a first stage, which is built on the Resnet-50 neural network architecture, such as that described in Kaiming He et al., "Deep residual learning for image recognition," 2016, which is hereby incorporated by reference in its entirety for all purposes. The Resnet-50 2D CNN generates spatial features. For each of the second, third, and fourth models, the spatial features are further processed by a supplemental model. For the second model, a non-local supplemental model is applied to the features generated by the 2D CNN. For the third model, a 1D convolution can be applied to the features generated by the 2D CNN to generate temporal information from the spatial features (which were generated by the 2D CNN) evaluated over multiple frames. The 1D convolution can be applied to features generated by the 2D CNN across multiple frames to generate temporal information about the features in the temporal dimension (over time). For the fourth model, a graph convolution can be applied to the features generated by the 2D CNN. Application of the graph convolution can result in generation of relational information from the spatial features generated by the 2D CNN to the available classes the neural network is trained to classify. In one illustrative example, the fifth model can be a 3D CNN using the Slowfast model described in Christoph Feichtenhofer et al., "Slowfast networks for video recognition," 2019.

Systems, apparatuses, processes (also referred to as methods), and computer-readable media (collectively referred to as "systems and techniques") are described herein for performing holistic video understanding. As used herein, holistic video understanding refers to understanding the content of a video across many interrelated categories of data contained in the video. In some examples, the systems and techniques are described herein as understanding, analyzing, and/or classifying video. However, the systems and techniques described herein as understanding, analyzing, and/or classifying video can be applied to any sequence of frames or images.

As described in more detail below, a holistic video understanding system can include one or more model decision engines (which can be machine learning models or machine learning systems), feature extraction machine learning models (or machine learning systems), and supplementary machine learning models (or machine learning systems). The one or more model decision engines can be trained to classify input video data for determining which feature extraction models to use for processing a particular video or portion of a video (e.g., based on a combination of computational efficiency and accuracy of the feature extraction models in combination with supplemental models available for selection). In one illustrative example, the model decision engine can be trained to select the most accurate model while keeping the average computations per video or portion of a video below 40 gigaFLOPs (GFLOPs). A portion of video can include a video clip (e.g., a video clip $v_{ij}$ as described below). During inference (after the one or more model decision engines have been trained), the classification output by the model decision engine can be used to determine which feature extraction model or models in the neural network will be used to process the input video or video portion. In some cases, the model decision engine can also be trained to learn features associated with the input video or frames of the input video. In some examples, the model decision engine can be trained using video frames and labels as training data, such as using one or more supervised or semi-supervised training techniques. During inference (e.g., after the model decision engine has been trained to extract features), the model decision engine can determine that in some cases the features it generated during the classification process are to be provided to a supplemental model and subsequently used to classify the input video, without requiring use of any of the other available feature extraction models.

In some examples, the model decision engine is a neural network or combination of multiple neural network architectures. In some examples, the model decision engine is a 2D CNN or any other suitable lightweight neural network architecture. As noted above, a 2D CNN is lightweight because it can recognize objects in a video based on a single video frame, rather than simultaneously performing functions (e.g., convolutions) across multiple frames. Using a lightweight neural network architecture for the model decision engine can reduce the computational complexity introduced by utilizing the model decision engine in the holistic video understanding system. Keeping the computational cost of including the model decision engine to a minimum (e.g., by using a lightweight neural network architecture) can lead to an overall increase in computational efficiency due to the computational savings of being able to choose light-weight feature generation models for some input videos. In one illustrative example, the neural network of the model decision engine includes a MobileNetV2 neural network architecture, such as that described in Mark Sandler et al., "MobileNetV2: Inverted Residuals and Linear Bottlenecks," 2019, which is hereby incorporated by reference in its entirety and for all purposes. In another illustrative example, the neural network of the model decision engine includes a Resnet-50 neural network architecture, such as that described in Kaiming He et al., "Deep residual learning for image recognition," 2016, which is hereby incorporated by reference in its entirety for all purposes.

In some examples, as described below, the model decision engine can be trained together with the feature extraction models and any supplemental models in an end-to-end process. In some examples, as described below, the model decision engine can be trained in the final stage of a three-stage process. For instance, the three-stage process can include a first step of training the feature extraction models until a certain accuracy level is achieved, a second step of training the supplemental models using features from the trained feature extraction models with frozen weights (e.g., where the weights of the trained feature extraction models do not change), and a third step of training the model decision engine using the trained feature extraction models and supplemental models with frozen weights. In some cases, the decision engine is trained using supervised learning with pseudo labels that tell the decision engine what model is most accurate. During the training iterations, the decision engine tries to maximize the accuracy of picking the most accurate model, with the parameters (e.g., weights, biases, etc.) being tuned at each iteration based on the determined losses.

In one illustrative example, as described in more detail below, the second step of the three-stage process can include training the model decision engine using a cross-entropy loss (denoted as $\mathcal{L}_{CE}$) or a binary cross-entropy loss (denoted as $\mathcal{L}_{BCE}$) and the third step can include training the model decision engine with the following loss: $\mathcal{L} = \mathcal{L}_\pi + \alpha \mathcal{L}_{uniform} + \beta \mathcal{L}_{flops}$, where $\mathcal{L}_\pi$ is a cross-entropy (CE) loss (or Softmax loss), $\mathcal{L}_{uniform}$ is a uniform loss, and $\mathcal{L}_{flops}$ is a FLOP loss. The BCE loss ($\mathcal{L}_{BCE}$) trains the decision engine to maximize the accuracy of getting the correct classifications based on binary cross entropy. The FLOP loss ($\mathcal{L}_{flops}$) trains the decision engine to select efficient models more often, as it is beneficial to minimize the expected (e.g., average over training data) FLOPs that will be used. The FLOPs that will be used can be computed based on the decision $\alpha_V$ from the decision engine. The beta (β) parameter controls or tunes the tradeoff between accuracy and complexity or computational efficiency (e.g., measured by FLOPs). For example, if β is set to 0, the result is that the decision engine will learn to use the most accurate models. Setting the β parameter to a high value (e.g., close to 1, such as 0.75, 0.80, 0.85, etc.) will result in a decision engine that selects picks the least computationally expensive model. The uniform loss ($\mathcal{L}_{uniform}$) can be used to ensure that the model decision engine does not always choose the same model that provides a certain tradeoff. The alpha (α) parameter is used to tune the uniform loss. One example of an optimal balance is by choosing the most accurate model that is on average below 40 GFLOPS.

The systems and techniques described herein can provide more accurate and efficient holistic video understanding by adaptively selecting between one or more machine learning models for processing video data. For example, as noted above, many video understanding systems apply a single fixed machine learning model to analyze all videos, regardless of whether the categories of data included in a particular input video are well suited for analysis by the fixed machine learning model. By adaptively selecting between multiple different machine learning models to perform video understanding based on the characteristics of the particular video or portion of a video being analyzed, the systems and techniques can analyze each video or portion of video by a model that is well suited to the characteristics (e.g., categories of data contained within the video or portion thereof) of the particular video or portion thereof. Further, by avoiding computationally expensive models unnecessary computations that are preferable for categories not present in the video or portion thereof, the computing and power resources of the device performing the video understanding techniques can be conserved for other operations.

While examples are described herein for classifying videos into specific classifications (e.g., playing the piano, child playing soccer, etc.), the holistic video understanding systems and techniques described herein can be used to generate other classifications not specifically listed. In some examples, the holistic video understanding systems and techniques described herein can be used to determine activities of people or objects in other categories and classifications, such as a person sitting at a desk in front of a computer, a person holding a mobile device, a robotics device in a factory environment, and/or any other actions, events, attributes, concepts and/or scenes.

Various aspects of the techniques described herein will be discussed below with respect to the figures. FIG. 1 is a block diagram illustrating an example of a holistic video understanding system 100. The holistic video understanding system 100 includes various components that are used to process video data (e.g., one or more videos) and detect or recognize categories of information (e.g., objects, actions, events, attributes, concepts and scenes). As shown, the components of the holistic video understanding system 100 include a video retriever 102, a storage device 104, a model decision engine 106, feature extraction models 108, supplemental models 110, and an output classifier 112.

The holistic video understanding system can include or be part of a mobile or stationary telephone handset (e.g., a smartphone, cellular telephone, or the like), a server computer (e.g., in communication with a vehicle computing system), a vehicle (e.g., a driver monitoring system (DMS) of a vehicle), a desktop computer, a laptop or notebook computer, a tablet computer, a set-top box, a television, a camera, a display device, a digital media player, a video streaming device, or any other suitable electronic device. In some examples, the holistic video understanding system 100 can include one or more wireless transceivers (or separate wireless receivers and transmitters) for wireless communications, such as cellular network communications, 802.11 Wi-Fi communications, wireless local area network (WLAN) communications, Bluetooth or other short-range communications, any combination thereof, and/or other communications. In some implementations, the components of the holistic video understanding system 100 (e.g., video retriever 102, storage device 104, model decision engine 106, feature extraction models 108, supplemental models 110, and an output classifier 112) can be part of the same computing device. In some implementations, the components of the holistic video understanding system 100 can be part of two or more separate computing devices. In some cases, the holistic video understanding system 100 can be implemented as part of the computing system 1200 shown in FIG. 12.

While the holistic video understanding system 100 is shown to include certain components, one of ordinary skill will appreciate that the holistic video understanding system 100 can include more components or fewer components than those shown in FIG. 1. In some cases, additional components of the holistic video understanding system 100 can include software, hardware, or one or more combinations of software and hardware. For example, in some cases, the holistic video understanding system 100 can include one or more sensors (e.g., one or more cameras, inertial measurement units (IMUs), radars, light detection and ranging (LIDAR) sensors, audio sensors, etc.), one or more display devices, one or more other processing engines, one or more other hardware components, and/or one or more other software and/or hardware components that are not shown in FIG. 1. In some implementations, additional components of the holistic video understanding system 100 can include and/or can be implemented using electronic circuits or other electronic hardware, which can include one or more programmable electronic circuits (e.g., digital signal processors (DSPs), microprocessors, microcontrollers, graphics processing units (GPUs), central processing units (CPUs), any combination thereof, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the holistic video understanding system 100.

The video retriever 102 can retrieve frames (e.g., video frames, images, etc.) from a storage device 104. The storage device 104 can include any suitable type of storage (e.g., any type of storage described with respect to storage device 1230 in FIG. 12 below). A video retrieved by the video retriever 102 can include a sequence of frames. For instance, the sequence of frames can include a group of consecutively captured images or other sequence of frames. In one illustrative example, the frames can include red-green-blue (RGB) images, luma, chroma-blue, chroma-red (YCbCr or Y'CbCr) images, monochrome images, and/or any other suitable type of images. In some cases, the video retrieved by the video retriever 102 can also receive an audio component from the storage device 104.

In some aspects, the video retriever 102 can partition a retrieved video from the storage device 104 into uniformly spaced portions or clips (e.g., each clip can include an identical number of frames). An example of video clips $v_{ij}$ is described below. In some examples, the video retriever can also partition audio data into individual audio segments such that the audio data matches the time associated with a corresponding sequence of frames for a portion of a video. In some aspects, the video can be stored as video portions or clips within the storage device 104, and the video retriever can retrieve clips from the storage device 104, rather than retrieving an entire video. In some aspects, the video retriever 102 can retrieve a complete video from the storage device 104. In such aspects, the complete video can be split into portions or clips elsewhere within the holistic video understanding system 100 (e.g., before being input into the model decision engine 106). In some aspects, the portions can include a subset of frames of the video, such as two frames, three frames, five frames, or any suitable number of frames. In some examples, the portions can be overlapping (e.g., the portions can share frames in common with one another from a sequence of frames). In one illustrative example where each video portion includes three frames, a first portion of the first video can include the first, second, and third frames of a video, while the second portion of the first video can include the second, third, and fourth frames of the video.

The frames retrieved by the video retriever 102 can be provided as input to the model decision engine 106. In some examples, the frames of the retrieved video may have larger dimensions than the dimensions of an input layer (not shown) of the model decision engine 106. In such cases, each input frame having larger dimensions can be normalized to a resolution matching the input dimensions or resolution the model decision engine 106 is configured to process. For instance, the model decision engine 106 (or other component of the holistic video understanding system 100) can normalize each frame having the larger dimension to the input dimension or resolution of the model decision engine 106 by downsampling or downscaling each frame. In one illustrative example, the video portions can be resized to match an input resolution of 224×224 (which the model decision engine 106 is configured to process) by resizing the smallest dimension of the retrieved video frames to 224 and extracting a center crop (e.g., a center portion of the video frame). In some examples, the downsampled, downsized, or otherwise resized frames can be stored in the storage device 104 to be used by subsequent stages of the holistic video understanding system 100.

In some examples, the model decision engine 106 can be trained to determine which model or models from the set of feature extraction models 108 to use for processing the input video or portion of the input video. In some cases, the model decision engine 106 can be trained to determine which model or models to use based on a combination of computational efficiency and accuracy of the feature extraction models 108 in combination with supplemental models 110 that are also available for selection by the model decision engine 106. For example, the model decision engine 106 can be trained to choose between a first machine learning model and a second machine learning model (from the feature extraction models 108 and/or the supplemental models 110) for processing the input video. In some examples, the model decision engine 106 can be trained to determine which set of "N" number of feature extraction models 108 to use for processing the input video, where "N" is an integer greater than or equal to one. The number of feature extraction models 108 can be made to include as many machine learning models as needed for the given application. Some example feature extraction models 108 can include 2D CNNs, 3D CNNs, audio processing models, optical flow networks, and any other neural network architecture that can be used for processing video data. In some examples, the model decision engine 106 can include a classification neural network trained to be able to classify N output classes equal to the number of feature extraction models 108. For instance, the model decision engine 106 can process video data and can determine probabilities for the N classes based on processing the video data. The model decision engine 106 can select a given model (from the feature extraction models 108) that is associated with the class having the highest probability value out of the N classes. In some examples, the neural network of the model decision engine 106 can include internal layers that generate one or more feature vectors from input video frames and a fully connected layer that combines the features of the one or more feature vectors into the N classes. Examples of training the model decision engine 106 are provided below.

During inference (once the model decision engine 106 has been trained), the model decision engine 106 can receive one or more frames of video representing an input video or video portion from the video retriever 102 and/or from the storage device 104. In some examples, the one or more frames of video representing an input video or video portion received by the model decision engine 106 from the video retriever 102 and/or the storage device 104 are portions of an input video, as described above. In some examples, the model decision engine 106 can generate a classification of the input video or video portion (e.g., the class having the highest probability among the N classes). In some cases, the model decision engine 106 can process each frame of the input video or video portion sequentially to generate a classification for each input video, video portion, or video frame. In some implementations, the model decision engine 106 can generate a classification from multiple sequential frames of an input video or video portion (e.g., by averaging features from multiple sequential frames and processing the averaged features using a multi-layer perceptron (MLP), a fully-connected layer, or other neural network component to generate the classification).

In some examples, the classification generated by the model decision engine can be used to determine which one of the feature extraction models 108 to use for further processing the input video (e.g., the entire input video). In some examples, the classification can be used to determine which model from the feature extraction models 108 to use for further processing a portion of the input video (e.g., one or more frames of the input video), where each portion of the video can receive a separate classification from other portions of the video. As an example, the first 90 frames of a video may contain a static scene, and action may commence in the video during the final 150 frames of the video. In such an example, the model decision engine 106 can determine (based on one or more classifications determined by the model decision engine 106) to use the 2D CNN for processing the first 90 frames and can determine to use the 3D CNN for processing the final 150 frames. In some examples, the classification output by the model decision engine 106 can be stored in the storage device 104.

In some examples, in addition to generating a classification, the model decision engine 106 can also generate features based on the input video or video portion. For example, the model decision engine 106 can include a 2D CNN that generates features from the input video. The features can be subsequently input into a layer of the model decision engine 106 (e.g., a fully connected layer or other layer) to generate the classification (e.g., indicating which feature extraction model 108 should be used to process the input video or portion thereof, as described above). In some examples, the features generated within the model decision engine can 106 also be stored in the storage device 104. The features generated by the model decision engine 106 can be used as input by one or more of the supplemental models 110 for additional processing or can be used directly to classify the video at the output classifier 112. In some examples, the features generated by the model decision engine 106 can be stored in the storage device 104.

The feature extraction models 108 can be trained to learn features associated with input videos or video portions. In some examples, the feature extraction models 108 can include at least two feature extraction models from which the model decision engine 106 can select. In some examples, the feature extraction models 108 can each have different neural network backbones that extract features from video data using different neural network architectures. For example, one feature extraction model from the feature extraction models 108 can include a 2D CNN that can be trained to extract spatial features from individual video frames (or images that are not part of a video). Another feature extraction model from the feature extraction models 108 can include a 3D CNN that can be trained to extract both spatial and temporal features from a sequence of frames. In some examples, the 3D CNN can be trained to generate spatial and temporal features by performing a convolution over a portion of a video that includes three frames, five frames, or any other number of frames that provides the desired trade-off between temporal resolution and computational cost for the features generated by the 3D CNN. In some cases, another feature extraction model from the feature extraction models 108 can be an audio model that can be trained to extract features from audio information associated with the input video. Another feature extraction model from the feature extraction models 108 can include an optical flow model that can be trained to detect motion of objects or features (e.g., edges, shapes) across multiple video frames. In some examples, two or more feature extraction models from the feature extraction models 108 can operate using a similar modality (e.g., 2D CNN, 3D CNN, or other CNN) but with different architectures. The different architectures may have different computational costs. For example, two of the feature extraction models 108 can both include 2D CNN architectures, where a first one of the 2D CNNs has a lower accuracy in generating spatial features but also a lower computational cost relative to the second 2D CNN. The feature extraction models 108 can be used to extract features that can subsequently be used to classify an input video. Examples of training the feature extraction models 108 are provided below.

During inference (once the feature extraction models 108 have been trained) the selected feature extraction model 108 (e.g., selected by the model decision engine 106) can receive one or more frames from the video retriever 102, the storage device 104, and/or the model decision engine 106. The feature extraction model 108 that is selected can be activated based on the classification generated by the model decision engine 106, as described above. In some examples, the model decision engine 106 can directly activate the selected feature extraction model 108 (e.g., by sending a command or signal instructing the selected feature extraction model 108 to begin). In some examples, the feature extraction models 108 can retrieve the classification output from the model decision engine 106 (e.g., directly from the model decision engine 106, from the storage device 104, etc.). The features extracted by a selected feature extraction model 108 can be provided as input to the supplemental models 110.

Depending on the type of model selected by the model decision engine 106, the selected feature extraction model 108 can process each frame of the one or more frames consecutively (e.g., one frame at a time), or multiple frames simultaneously. For instance, when a 2D CNN is selected from the feature extraction models 108, the 2D CNN can extract spatial features from each frame (e.g., based on processing that frame individually). In another example, when a 3D CNN is selected from the feature extraction models 108, the 3D CNN can extract spatial and temporal features from multiple consecutive frames (e.g., based on processing the multiple frames simultaneously). In some cases, it can be favorable to select a 2D CNN. For instance, a 2D CNN can have a relatively low computational cost (e.g., measured by the number of floating point operations (FLOPs) required to generate features using the model), as compared to a 3D CNN or other model. In some examples, a ratio of computational cost between the 2D CNN and the 3D CNN can be a function of a number of video frames K simultaneously processed by the 3D CNN, where K can be equal to the depth of the 3D CNN kernel in the temporal dimension. In some cases, it can be favorable to select a 3D CNN. For example, a 3D CNN can provide a strong temporal bias for understanding actions in a particular video or portion of a video. In one example, a 2D CNN can be selected by the model decision engine 106 when the video or portion of a video being analyzed depicts a static scene (e.g., from a wall-mounted camera) and there is little or no motion in the scene. In such an example, the model decision engine 106 can determine that the characteristics of the video (e.g., the static scene) are such that the 2D CNN should be used for the video. In another example, a 3D CNN can be selected by the model decision engine 106 when the video or portion of a video being analyzed depicts a dynamic scene (e.g., a scene filmed by a static or moving camera that includes moving objects, such as a sporting event). In such an example, the model decision engine 106 can determine that the characteristics of the video (e.g., the movement within the scene) are such that the 2D CNN should be used for the video. The ability of the 3D CNN to detect actions by extracting features from the video data across multiple frames simultaneously can result in a more accurate understanding of the video content relative two a 2D CNN that can only extracts features from one frame at a time.

In some cases, the output of a feature extraction model from the feature extraction models 108 can include a feature vector (or other feature representation) representing the features extracted from each frame or from a sequence of frames. In some cases, a single feature vector can be extracted from one input frame, with the feature vector representing features of the input frame (e.g., for a 2D CNN that generates spatial features per frame). The features (e.g., represented as a feature vector) extracted from an input frame provide a representation of the frame, including information contained within the input frame. In some cases, a single feature vector can be extracted from multiple input frames, with the feature vector containing all the information associated with features of the multiple input frames (e.g., for 3D CNNs or optical flow networks that generate spatial and temporal features over multiple frames). In one illustrative example, the feature vector generated per frame or for multiple frames by a feature extraction model can be a 1×2048 vector (indicating the feature vector is a one-dimensional feature vector with a length of 2048 values). In some examples, the storage device 104 can be used to store features extracted from the input video or video portion by the feature extraction models 108 (e.g., by storing the feature vector extracted for each frame or group of frames). In some cases, a feature representation other than a feature vector can be used, such as a tensor or other representation.

The supplemental models 110 can be trained to supplement the features extracted by the feature extraction models 108 with additional information that can be used to classify the video. During inference (e.g., after the supplemental models 110 are trained), the supplemental models 110 can receive features output by the feature extraction models 108 and can provide further processing. In some examples, a fully connected layer (not shown) can be included between the feature extraction models 108 and the supplemental models 110. In one example, as noted above, a feature extraction model that utilizes a 2D CNN can have a strong spatial bias in the features it generates, but may not contain any temporal information across multiple frames because the 2D CNN only operates on a single frame of video at a time. In some examples, a supplemental model from the supplemental models 110 can be applied to the features generated by the 2D CNN for multiple frames in order to generate temporal information across the multiple frames. In one example, a supplemental model can include a 1D convolutional neural network that can be applied to features generated by a 2D CNN (selected from the feature extraction models 108) for multiple frames to generate the temporal information for the multiple frames. Illustrative examples of 1D convolutional networks (as examples of a supplemental model) are described below with respect to FIG. 2A-FIG. 2D below.

Figure 2B:
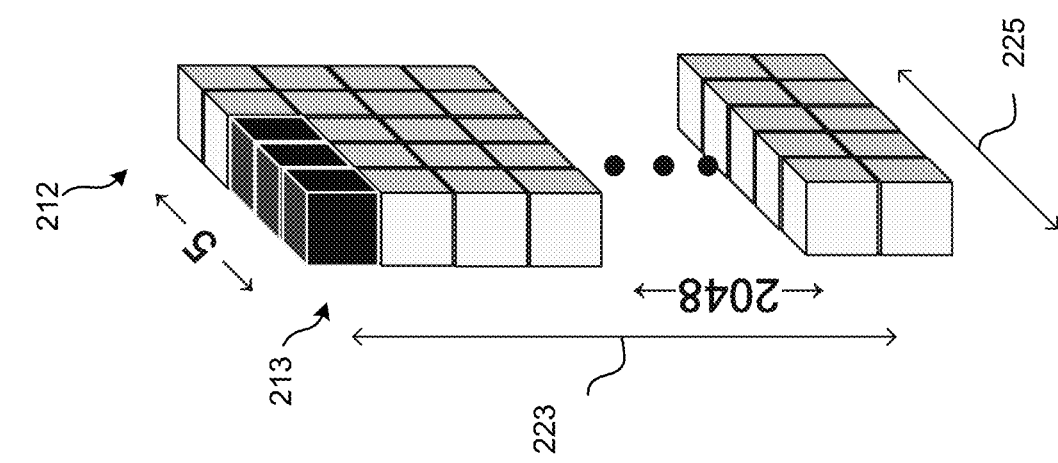
Figure 2A:
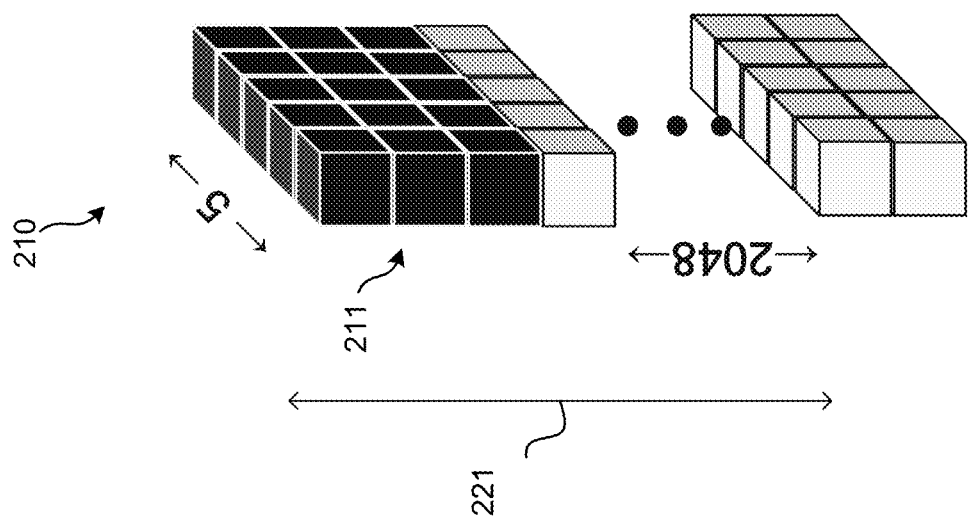

FIG. 2A-FIG. 2C illustrate example convolution operations that can be used as supplemental models 110 applied to features generated by a feature extraction model 108 in the holistic video understanding system 100 of FIG. 1. FIG. 2A-FIG. 2C illustrate combined feature vectors, including a combined feature vector 210 (in FIG. 2A), a combined feature vector 212 (in FIG. 2B), and a combined feature vector 214 (in FIG. 2C). including a combination of five 1×2048 feature vectors from five consecutive frames output by a 2D CNN feature extraction model, as described above with respect to FIG. 1. The resulting combined feature vectors 210, 212, and 214 each have dimensions of 5×2048 (indicating that each combined feature vector 210, 212, and 214 includes features from five consecutive frames output from the 2D CNN). In the illustrated examples of FIG. 2A-FIG. 2C, each cube (whether black or white in color) in the combined feature vectors 210, 212, and 214 represents one value of the combined feature vector. The black shading in the cubes of combined feature vectors 210, 212, 214, and 216 of FIG. 2A-FIG. 2D illustrate different convolutional filters that can be applied to the combined feature vectors (where the convolutional filters move across the data over time). In the example of FIG. 2A, the selected convolutional filter 211 is a 5×3 kernel that spans across all five values in the temporal dimension and across three channels (in the direction indicated by the arrow 221). In the example of FIG. 2A, the kernel moves along the channel dimension (as illustrated by the arrow 221) to perform the convolution.

In the example of FIG. 2B, the selected convolutional filter 213 is a 3×1 kernel that spans across three values in the temporal dimension and one value in the channel dimension. The 3×1 kernel moves along both the temporal and channel dimensions (as illustrated by the arrow 223 in the channel dimension and the arrow 225 in the temporal dimension). In some cases, the 3×1 kernel first moves in the temporal dimension for each channel one "column" at a time in the temporal dimension (corresponding to a stride value of one) to generate three new convolution output values for the first channel. In some cases, the 3×1 kernel then moves to the next "row" in the channel dimension of the combined feature vector (corresponding to a stride value of one). The 3×1 kernel can then repeat three convolutions moving in the temporal dimension to generate three additional new convolutional output values for the second channel. In some examples, the process can repeat for each "row" in the channel dimension to generate a 3×2048 convolution output. In some cases, an additional neural network layer can be used to generate a 1×2048 output from the 3×2048 convolutional output. In one illustrative example, an additional convolution (e.g., using a 3×1 kernel) that moves along the channel dimension one "row" at a time (corresponding to a stride value of one) can be applied to the 3×2048 convolution output to produce a 1×2048 combined feature vector.

The convolutional filter illustrated in FIG. 2B can be considered a 2D convolution because the kernel moves along both the temporal and channel dimensions.

In the example of FIG. 2C, the selected convolutional filter 215 is a 3×2048 filter kernel that spans across three values in the temporal dimension and all 2048 values in the channel dimension. A first 3×2048 kernel moves along the temporal dimension (as illustrated by arrow 227), such as one cube at a time, two cubes at a time, etc. In one illustrative example, the first 3×2048 kernel creates a first convolutional output value based on a convolution of the 3×2048 features in the first position. In such an example, the first 3×2048 kernel can move in the temporal dimension one "column" at a time and generate two additional values for a total of 3×1 convolutional output values. In such an example, the process can be repeated with 2047 additional 3×2048 kernels to generate a 3×2048 combined convolutional output vector. In some examples, an additional neural network layer (e.g., a convolutional layer) can be used to generate a 1×2048 output from the 3×2048 convolutional output. In some implementations, the convolutional filter 215 described in FIG. 2C can be used to capture reoccurring patterns from the combined feature vector 214 that are present in the temporal dimension of the data. The convolution illustrated in FIG. 2C can be considered a 1D convolution because each kernel moves along the temporal dimension only.

Figure 2D:
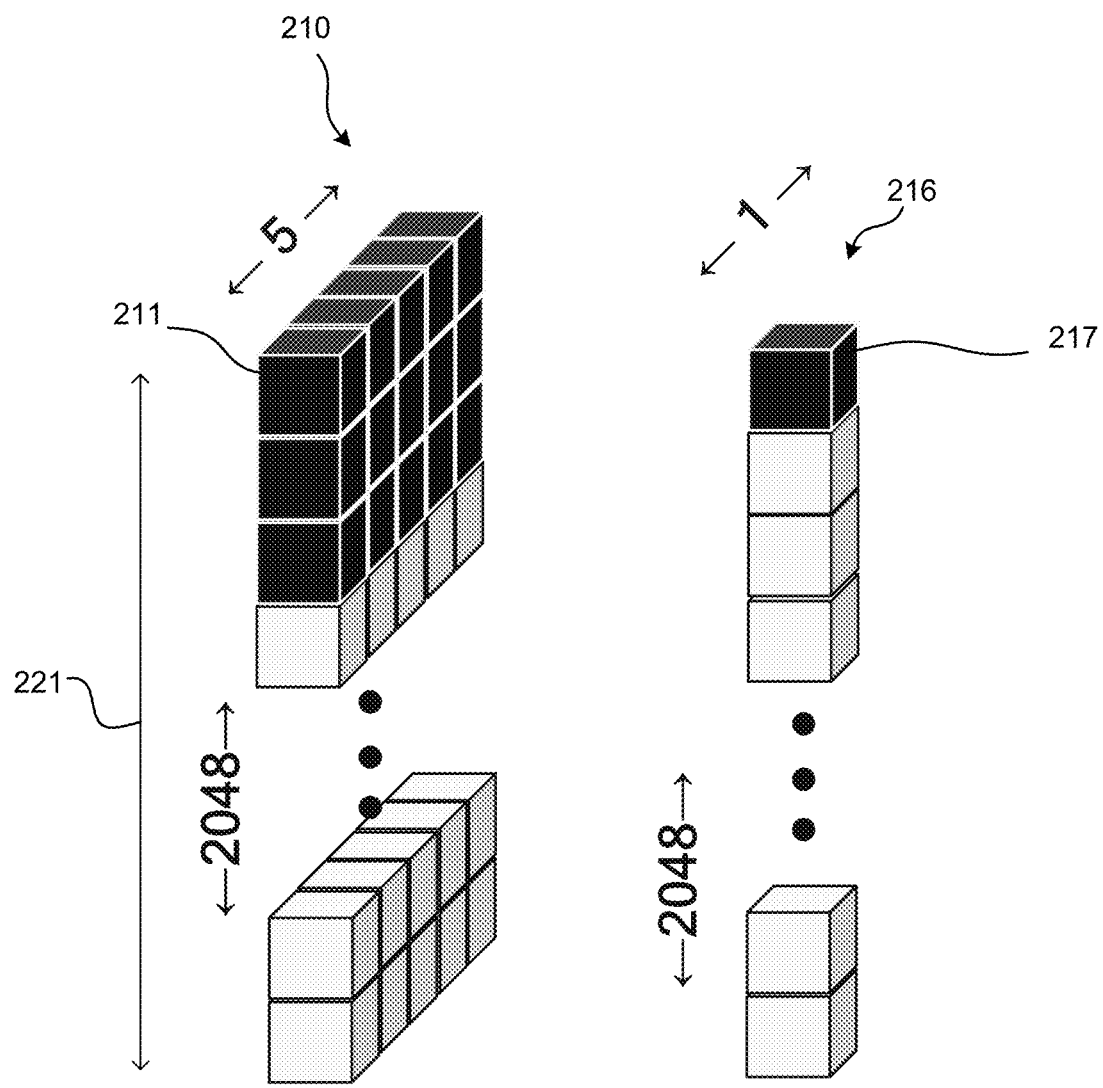

FIG. 2D illustrates an example of an output of the 1D convolution illustrated in FIG. 2A. The convolutional filter 211 (as illustrated by the black cubes in the combined feature vector 210) can be used to generate a new feature vector 216 of dimension 1×2048. As shown, the first element of the new feature vector 216 (as illustrated by the black cube 217) is generated based on the 5×3 convolution filter kernel applied to the first three "rows" (in the temporal dimension) of the combined feature vector 210. Similarly, the second element of the new feature vector 216 can be generated by advancing the 5×3 convolution filter by one row (e.g., along the direction of the arrow 221) and applying the convolution to respective elements of the combined feature vector 210. As the filter kernel moves in the channel dimension (as shown by arrow 221), each subsequent element of the new feature vector 216 can be generated based on applying the 5×3 convolution filter. The resulting new feature vector 216 can have dimensions 1×2048, as noted above, where each element of the new feature vector 216 represents the result of the convolution filter applied to the combined feature vector 210. By combining features from multiple frames using this technique, temporal information about the features can be generated despite the original features being extracted from individual frames without any temporal information. Such a technique offers the advantage of including temporal information for a more holistic understanding of the input video without incurring the full computational cost of performing a three-dimensional convolution.

It should be understood that, although the examples above regarding FIG. 2A-FIG. 2D are described in terms of combined feature vectors being output from a 2D CNN, the convolutional filters described in FIG. 2A-FIG. 2D can be applied to any feature vector regardless of the type of neural network it originates from. In addition, although the examples of FIG. 2A-FIG. 2C illustrate combined feature vectors having dimensions of 5×2048, a person of ordinary skill will understand that the filters described can be applied to feature vectors having different dimensions. For example, a combined feature vector representing only three frames of feature data may have a dimension of 3×2048. In another example, a combined feature vector representing 5 frames of feature data may have fewer features, such as 1024 features, and a combined feature vector in that case may have a dimension of 5×1024.

Returning to FIG. 1, additional supplemental models 110 may be provided to further process features from the feature extraction models 108, as noted above. In some examples, a supplemental model (from the supplemental models 110) that is applied to the features generated by a feature extraction model 108 may not apply an additional inductive bias to the output of the feature extraction model 108. For example, as described above with respect to FIG. 2D, a 1D convolution supplemental model (selected from the supplemental models 110) can be used to generate temporal information for a video based on features of the video extracted by a 2D CNN feature extraction model (from the feature extraction models 108) when the video contains no motion (e.g., a static scene) or a small amount of motion that is not sufficient to benefit from the increased computational effort of a 3D CNN. As an example, the 1D convolution supplemental model may be selected when an input video contains a static scene, such as a scene from an IP camera pointed at a fixed location where there may be occasional movement of objects or people within the scene to analyze. Such an approach can reduce computational effort because the temporal information can be processed from spatial features of video frames extracted by the 2D CNN, rather than simultaneously extracting spatial and temporal information from the video frames directly (e.g., with a 3D CNN), which can require processing significantly more data.

Another example of a supplemental model is a non-local model (also referred to as an attention model or non-local attention model). A non-local model can extract temporal information from features extracted by a 2D CNN feature extraction model by comparing features from each video frame to features from one or more other video frames (e.g., every other video frame) in a set of video frames. For example, for a set of five video frames, the first frame features can be separately compared to the features of each of the second, third, fourth, and fifth frames to determine if events or actions in far apart frames (e.g., the first and fifth frames, the first and fourth frames, the second and fifth frames, the second and fourth frames, etc.) are related. For a large number of frames, the number of comparisons by a non-local supplemental model can become large. A benefit of a non-local model is that it can detect relationships that are not detected by models that only analyze information from closely grouped frames (e.g., consecutive frames). For example, in contrast to the 1D convolution supplemental model, the inductive bias of the non-local model does not necessarily assume that related actions will be grouped together temporally. By attempting to determine these types of non-local relationships in a video, a holistic video understanding system 100 can become more holistic based on the ability to analyze characteristics across a wider range within the video (e.g., across more frames that are temporally separated). An illustrative example where a non-local supplemental model 110 may be useful is a video of dominos falling, where the effect of a domino falling in a first frame may not be seen on the final domino until a large number of frames later. The relationship between the first and last domino falling may not be detected by a 3D CNN or a 2D CNN supplemented by a 1D convolution, but could be detected by a 2D CNN supplemented by a non-local model.

Another example supplemental model that can be applied to the features extracted by a 2D CNN feature extraction model 108 is a graph convolutional network. In some examples, a graph convolutional network can be used as a supplemental model (of the supplemental models 110) to relate features from a feature extraction model (from the feature extraction models 108) to certain concepts utilizing knowledge of the final classifier(s) that will be applied by the classifier 112. In some examples, the graph convolutional network applies a concept or relational bias to features it receives. In one example, a graph convolutional network may be able to infer, based on the presence of features (e.g., a ball, a child, grass, etc.) generated by a feature extraction model, that the classification "child playing soccer" applies to the video or video portion. In some implementations, this can be done by relating the features to concepts and/or output classifiers or classification. In some cases, a supplemental model may not apply any additional inductive bias to the features generated by the feature extraction model. For instance, the supplemental model may serve the purpose of connecting the features generated by a feature extraction model to one of the classes the output classifier 112 is trained to classify. In one illustrative example, where the feature extraction model from the feature extraction models 108 is a 3D CNN, the supplemental model 110 may be a multi-layer perceptron (MLP) or a fully-connected layer. For instance, the model decision engine 106 may select a 3D CNN from the feature extraction models 108 with an MLP supplemental model 110 based on a video or video portion containing large amounts of motion (e.g., a video of a sporting event where the camera is also in motion). In some examples, the output of the supplemental models 110 can be stored in the storage device 104.

The output classifier 112 can be trained to classify an input video or video portion (or features associated with the input video or video portion) with one or more classifications. A training dataset that includes example videos and classification labels can be used to train the output classifier 112, such as using the techniques described with respect to FIG. 10 and FIG. 11. During inference (e.g., after the output classifier 112 has been trained), the output classifier 112 can receive outputs from the supplemental models 110 and can use the output to classify the input video or video portion. Example classifications can include "playing the piano," "child playing soccer," and any other classification that the output classifier 112 is trained to classify.

In some cases, the system including the model decision engine 106, feature extraction models 108, supplemental models 110, and output classifier 112 can be trained in a single end-to-end training sequence. In one implementation of an end-to-end training sequence, a Gumbel Softmax layer (also referred to as a Gumbel layer) can facilitate the end-to-end training. The Gumbel layer can allow the model decision engine 106 to make discrete decisions while still being differentiable so that a backpropagation training process can be performed. In some examples, a backpropagation training process can be performed to adjust the weights (and in some cases other parameters, such as biases) of the nodes of each of the neural networks (e.g., the model decision engine 106, the feature extraction models 108, the supplemental models 110, and the output classifier 112). As described in more detail with respect to FIG. 10, backpropagation can include a forward pass, a loss function, a backward pass, and a weight update. The forward pass, loss function, backward pass, and parameter update can be performed for each training iteration (e.g., for each batch of data from the training set or for the entire training data set). The backpropagation process can be repeated for a certain number of iterations for each set of training data until the weights of the parameters of the model decision engine 106, feature extraction models 108, supplemental models 110, and output classifier 112 are accurately tuned. In some examples, the loss function used in the end-to-end training process can include cross-entropy (CE) loss, binary cross-entropy (BCE) loss, FLOP loss, uniform loss, any combination thereof, or any other suitable loss function. In some examples, the loss function used in the end-to-end training process can include a weighted combination of multiple loss functions (e.g., a combination of a BCE loss and a FLOP loss with different weightings).

In some cases, it can be difficult to train the model decision engine 106 using the end-to-end training process with the entire holistic video understanding system 100. For instance, the model decision engine 106 can predict which model to select based on past statistics of the feature extraction models 108, supplemental models 110, and classifier 112, and these models change during each iteration of training as a result of the end-to-end nature of the training. In some examples, rather than training the holistic video understanding system 100 end-to-end, a three-stage training process can be utilized. For instance, during the first stage of the three-stage training process, the feature extraction models 108 can be trained. Similar to the end-to-end training process described above, a backpropagation training process can be performed to adjust the weights (and in some cases other parameters, such as biases) of the nodes of each of the feature extraction models 108. A loss function can be used to analyze error in the output of the feature extraction models 108 relative to known outputs or ground truths (e.g., based on ground truth labels associated with the training data). In one illustrative example, a cross-entropy loss function can be used. Other loss functions can be used in some cases. After training the feature extraction models 108, the weights (and in some cases other parameters, such as biases) of the feature extraction models 108 can be fixed (or "frozen").

In some examples, the supplemental models 110 can be trained in a second stage of the three stage training process using features extracted by the trained feature extraction models 108. In some cases, the supplemental models can be trained using a backpropagation training process similar to the process described for the feature extraction models 108. After training, the weights (and in some cases other parameters, such as biases) of the supplemental models 110 can be fixed or frozen. In some examples, the model decision engine 106 can be trained in the final stage of the three-stage training process, after the feature extraction models 108 and the supplemental models 110 are trained. In some cases, during the three-stage training process, the model decision engine 106 can be trained to learn which model or models among a set of fixed models (e.g., the feature extraction models 108 and the supplemental models 110) should be selected for processing an input video or video portion. In some examples, the same dataset can be used for all three training stages of the three-stage training process. Additional details of training holistic video understanding systems, including example loss functions that can be used to train model decision engine 106, are provided in reference to the description of FIG. 3 below.

Figure 3:
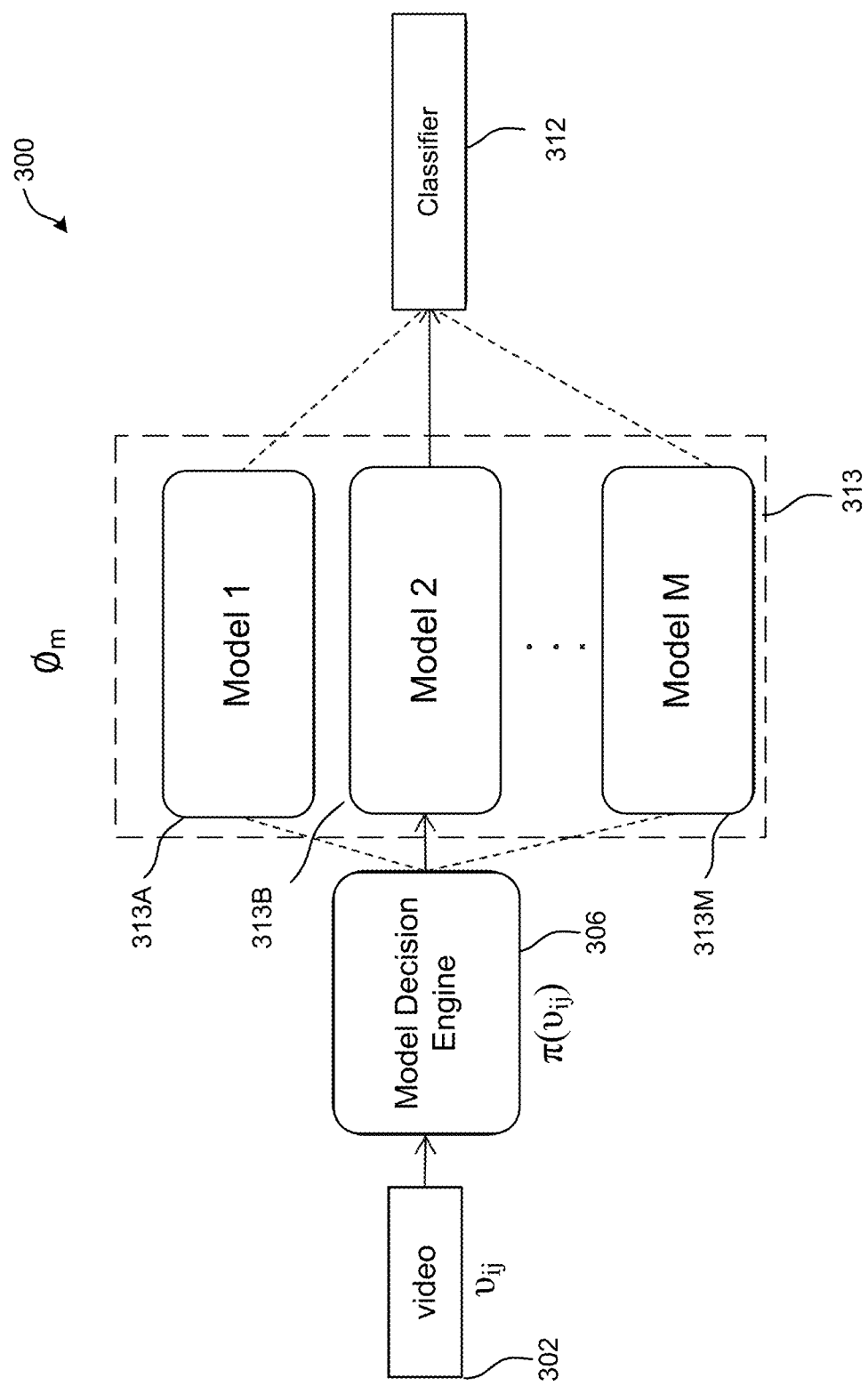
FIG. 3 is a block diagram illustrating an example of a holistic video understanding system, in accordance with some examples.

FIG. 3 is a diagram illustrating another example of a holistic video understanding system 300. As shown, the components of the holistic video understanding system 300 include a model decision engine 306, video processing models 313A, 313B, through 313M, and a classifier 312. One or more components of the holistic video understanding system 300 of FIG. 3 can be similar to and perform similar operations as like components of the holistic video understanding system 100 of FIG. 1. For example, the model decision engine 306 and classifier 312 can be similar to and perform similar operations as the model decision engine 106 and output classifier 112 of FIG. 1. The video processing models 313A, 313B, through 313M are examples of the feature extraction models 108 of FIG. 1.

In some examples, model decision engine 306 can be trained to determine which model or models from the video processing models 313A, 313B, through 313M to use for processing an input video 302 or video portion (a video clip $v_{ij}$ as described below). In some cases, the model decision engine 306 can be trained to determine which model or models to use based on a combination of computational efficiency and accuracy of the video processing models 313A, 313B, through 313M in processing the input video 302. In some examples, the model decision engine 306 can include a classification neural network trained to classify N classes equal to the number of video processing models 313A, 313B, through 313M. For instance, the model decision engine 306 can process video data and can determine probabilities for the N classes based on processing the video data. The model decision engine 306 can select a video processing model (from the video processing models 313A, 313B, through 313M) that is associated with the class having the highest probability value out of the N classes. In some examples, the neural network of the model decision engine 306 can include internal layers that generate one or more feature vectors from input video 302 or a video portion. In some cases, the neural network of the model decision engine 306 can further include a fully connected layer that combines the features of the one or more feature vectors into the N classes.

During inference (after the model decision engine 306 is trained), the model decision engine 306 can determine which one or more of the video processing models 313A, 313B, through 313M to use for processing an input video 302 or video portion. Referring back to FIG. 1, in some implementations, the model decision engine 306 can receive the input video 302 or video portion from the video retriever 102 and/or from the storage device 104. In some examples, the input video can be broken down into J equally sized portions $v_{ij}$. Referring back to FIG. 1, in some cases, the video processing models 313A, 313B, through 313M can each include one feature extraction model (from the feature extraction models 108) and a corresponding supplemental model (from the supplemental models 110). As noted above, based on processing the input video 302 or video portion, the model decision engine 306 can generate classifications (e.g., N classes) that represents the probability that each available model of the video processing models 313A, 313B, through 313M will produce the best output for a particular input video 302 or video portion (e.g., based on a combination of accuracy and computational effort). In some examples, the model decision engine 306 can select a single video processing model (e.g., the video processing model associated with the class having the highest probability among the N classes) to process the input video 302 or video portion. In some cases, the classification produced by the model decision engine 306 can be a one-hot representation, where the selected model has a value of 1, and the non-selected model(s) have a value of 0. In one illustrative example, for a holistic video understanding system 300 that includes two video processing models, a classification vector [1 0] can indicate that the model decision engine 306 has selected the first video processing model from the video processing models 313A, 313B, through 313M to process the input video 302 or video portion $v_{ij}$.

In some examples, the model decision engine 306 can select two or more video processing models from the video processing models 313A, 313B, through 313M to process the input video 302. For instance, the model decision engine 306 can select two or more video processing models to process the input video 302 or video portion when there is no clear best choice model from the video processing models 313A, 313B, through 313M. In some examples, the output of the two or more selected video processing models from the video processing models 313A, 313B, through 313M can be combined before final classification of the input video 302 or video portion by the classifier 312. In one illustrative example, the output of the two selected models can be combined by averaging. In some cases, the classifier 312 can receive the output of a selected video processing model (or a combined output from two or more selected video processing models) from the video processing models 313A, 313B, through 313M. Using the output, the classifier 312 can classify the input video 302 or video portion. Example classifications include "playing the piano," "child playing soccer," "making a sandwich," and "listening to classical music." Referring to FIG. 1, the storage device 104 can be used to store features extracted from the frames of the video 302 by the selected video processing model (or models) from the video processing models 313A, 313B, through 313M.

In one illustrative example of a training process for the holistic video understanding system 300 of FIG. 3, a dataset D containing V videos can be used for the training process. For the dataset D, $v_{ij}$ (which can correspond to input video 302 in FIG. 3) represents J uniformly spaced (and potentially overlapping) clips of a video from the videos V (where the video is represented as $v_i \in V$). The video clips $v_{ij}$ are used as an example of portions (e.g., each video clip $v_{ij}$ including a portion) of the input video 302 that can be processed by the holistic video understanding system 300. A term $\emptyset_m$ represents the neural networks (e.g., the video processing models 313A, 313B, through 313M in FIG. 3) that are available for selection by the model decision engine 306. For a particular video clip $v_{ij}$, a selected neural network (from the video processing models 313A, 313B, through 313M) can provide a prediction $\hat{y}_{ij} = \emptyset_m(v_{ij})$. In some cases, each individual neural network $\emptyset_m$ can be separately trained with a cross-entropy (CE) loss, as follows:

$$\mathcal{L}_{CE} = -\mathbb{E}_{(v_{ij}, y_i) \sim D}[y_i \log(\hat{y}_{ij})]$$

where $\mathbb{E}_{(v_{ij}, y_i) \sim D}$ is the expected value and the loss function is evaluated iteratively over the dataset D for all clips $v_{ij}$ and associated labels $y_i$. In some cases, a binary cross-entropy (BCE) loss function can be used to train each individual neural network $\emptyset_m$. In some aspects, a BCE loss function can be used to train the neural networks $\emptyset_m$ to apply multiple classification labels to a single video.

In one illustrative example, all models $\emptyset_m$ can be trained for ten epochs with an Adam optimizer having an initial learning rate of 1e-4. An epoch is one pass of the entire dataset through a given model. In such an example, the models $\emptyset_m$ can be tuned down to 1e-5 and 1e-6 at epoch two and epoch seven, respectively. In one illustrative example, the input resolution of the video clips $v_{ij}$ is 224×224 after resizing the smallest dimension of the input video 302 to 224 and extracting a center crop, as described above. In the illustrative example, during training, each video processing model 313A through 313M can end with a classification layer including a dropout layer with (p=0.5) and a linear layer to classes of the specific dataset.

As described above, in a three-stage training process, the feature extraction models 108 can be trained individually in the first stage. Once the individual feature extraction models 108 are trained, the supplemental models 110 can be trained using trained feature extraction models 108 with fixed or frozen weights in the second stage. Returning to FIG. 3, in some examples, the video processing models 313A, 313B, through 313M can incorporate both a feature extraction model 108 and a supplemental model 110, as described in FIG. 1. In such examples, the first training stage can be applied to the feature extraction model and the second training stage can be applied to the supplemental model incorporated within the video processing model 313 using the cross-entropy loss described above. In the third stage, the model decision engine 306 can be trained to predict which neural network (e.g., which of the video processing models 313A, 313B, through 313M) to apply to a particular video clip. The model decision engine 306 can be represented mathematically by a function $\pi(v_{ij})$. In some implementations, the model decision engine 306 chooses which model to use to process a video or video portion, where the choice of the decision engine 306 can be defined by $a_{ij} = \pi(v_{ij})$. Predictions $\hat{y}_{ij}$ from the choice $a_{ij}$ (e.g., the selected model m) of the decision engine 306 can be represented by:

$$\hat{y}_{ij} = \Sigma_{\emptyset_m} \mathbb{1}[a_{ij}=m] \emptyset_m(v_{ij}).$$

Where $\mathbb{1}$ is the indicator function, and $\emptyset_m(v_{ij})$ is the output classification of model m.

Ground truth labels $y_i$ for the model decision engine 306 can be inferred by running the video clips $v_{ij}$ of the dataset D through the neural networks $\emptyset_m$. The accuracy of the model decision engine 306 can be evaluated by the following cross-entropy (CE) loss function (also referred to as Softmax loss):

$$\mathcal{L}_\pi = -\mathbb{E}_{(v_{ij}, y_i) \sim D}[CE(\mathrm{argmax}_m(y_i \log(\hat{y}_{mij})), a_{ij})]$$

In some examples, $\mathrm{argmax}_m$ returns a one-hot representation with the value 1 for the neural network (chosen from neural networks $\emptyset_m$) with the maximum negative cross-entropy.

In addition to the CE loss $\mathcal{L}_\pi$ above, additional loss functions can be applied to optimize the decision by the model decision engine 306. For instance, a uniform loss term can also be used. The uniform loss term forces the model decision, on average, to select each neural network $\emptyset_m$ among a total number M of available neural networks (e.g., video processing models 313A, 313B, through 313M of FIG. 3) an equal number of times as represented below:

$$\mathcal{L}_{uniform} = \sum_{m=0}^{M} \left(\mathbb{E}_{(v_{ij}) \sim D}[\mathbb{1}(a_{ij}=m)] - \frac{1}{M}\right)^2$$

Finally, a loss function that addresses efficiency of the overall system can be used, where the amount of computational effort, represented by the total number of FLOPs can be optimized. An example of such a loss function (referred to as FLOP loss) is as follows:

$$\mathcal{L}_{flops} = \mathbb{E}_{(v_{ij}) \sim D}[FLOPS(v_{ij})]$$

An overall loss function that combines the three loss functions above can be used to train the model decision engine 106. The overall loss function can be represented mathematically as follows:

$$\mathcal{L} = \mathcal{L}_\pi + \alpha \mathcal{L}_{uniform} + \beta \mathcal{L}_{flops}$$

Where α and β are weights that can be applied to tune the overall loss function $\mathcal{L}$. For example, increasing β can increase the degree to which the overall loss function factors in FLOP loss, while setting β to zero will cause the overall loss function to ignore FLOP loss.

Figure 4:
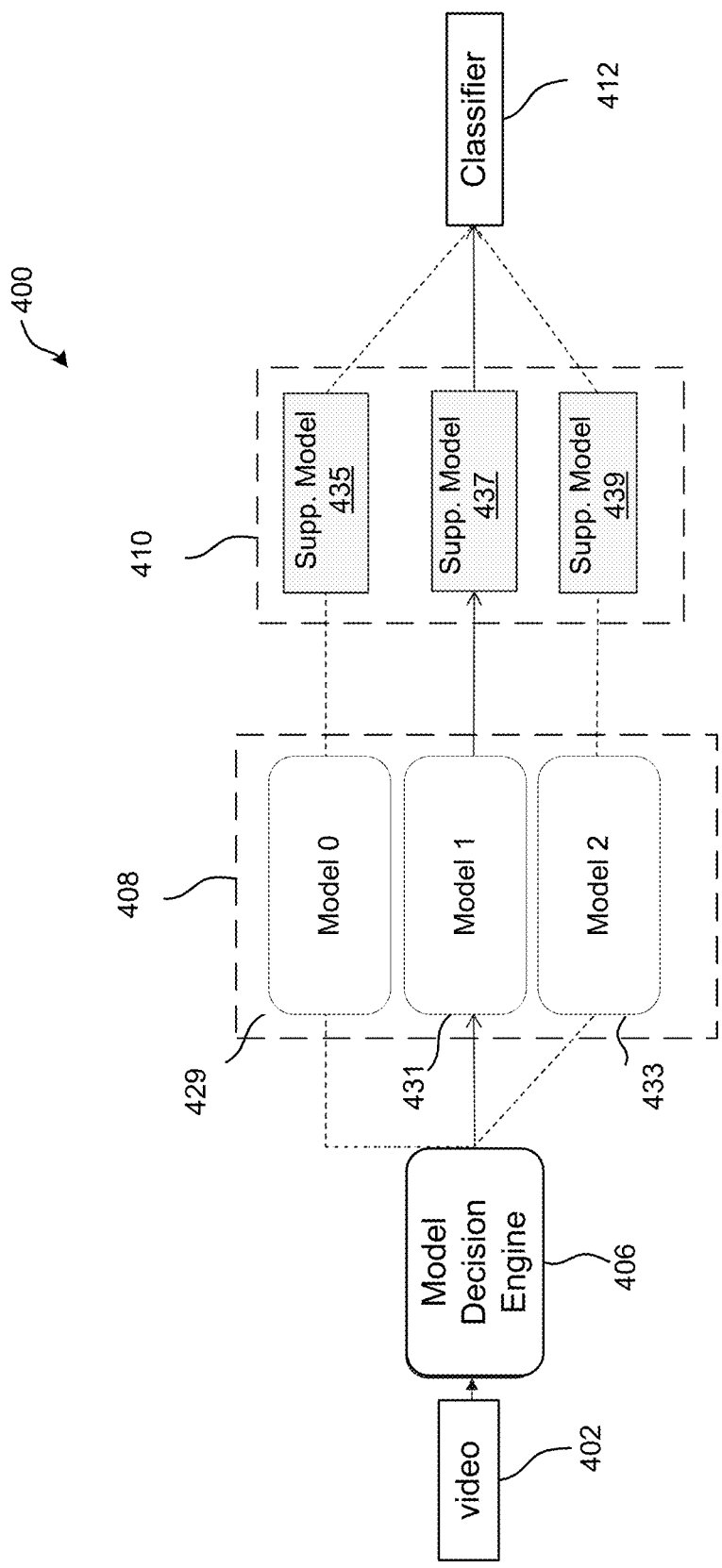
FIG. 4 is a block diagram illustrating another example of a holistic video understanding system, in accordance with some examples.

FIG. 4 is a diagram illustrating an example of a holistic video understanding system 400. As shown, the components of the holistic video understanding system 400 include a model decision engine 406, feature extraction models 408, supplemental models 410, and a classifier 412. In the example of FIG. 4, the feature extraction models include a feature extraction portion 429 (which can be part of the model decision engine 406 in some cases), a first feature extraction model 431 and a second feature extraction model 433. The supplemental models 410 include a first supplemental model 435, a second supplemental model 437, and a third supplemental model 439. An input video 402 that is processed by the model decision engine 306 can be a full video or a video portion (e.g., retrieved from the video retriever 102 and/or storage device 104 of FIG. 1).

One or more components of the holistic video understanding system 400 of FIG. 4 can be similar to and perform similar operations as like components of the holistic video understanding system 100 of FIG. 1 and/or any of the other examples of holistic video understanding systems described herein. For example, supplemental models 410 and the classifier 412 can be similar to and perform similar operations as the supplemental models 110 and output classifier 112 of FIG. 1. The feature extraction models 408 of FIG. 4 can be similar to and perform similar portion as like components of the holistic video understanding system of FIG. 1, except as described below.

Similar to that described above, the model decision engine 406 can be trained to determine which feature extraction model from the feature extraction models 408 to use for processing the input video 402 or video portion. The model decision engine 406 can also be trained to extract features from the input video 402 or video portion. During inference (e.g., after the model decision engine 406 has been trained), the model decision engine can extract features from the input video 402 or video portion as a step in a classification process that determines which feature extraction model from the feature extraction models 408 to use for processing the input video 402 or video portion. In some examples, the model decision engine 406 can determine that the features generated by a given model from the feature extraction models 408 provide the best desired outcome (e.g., the best combination of accuracy and computational effort) when compared to the features from other models of the feature extraction models 408. As noted above, in some implementations, the feature extraction portion 429 can be part of the model decision engine 406 and can be considered as one of the feature extraction models 408. As shown in FIG. 4, each feature extraction model 408, including the feature extraction portion 429 of model decision engine 406, can be associated with a supplemental model 410 as described above with respect to FIG. 1.

In one illustrative example of the holistic video understanding system 400, the model decision engine 406 includes a MobilenetV2 neural network, the model 431 includes a Resnet-50 neural network, and the model 433 includes a Slowfast neural network. In such an illustrative example, the supplemental model 435 and the supplemental model 437 can each include a 1D convolutional network (e.g., a 1D convolutional network as described above regarding FIG. 2A and FIG. 2D). Continuing with the same example, the supplemental model 439 can include an MLP. The MobileNetV2 and Resnet-50 networks are 2D CNNs that extract spatial features from individual video frames. The spatial features from the MobileNetV2 and Resnet-50 networks can be supplemented with temporal information from the supplemental 1D convolution network. The Slowfast network includes a 3D CNN that extracts features that include both spatial and temporal information in a 3D convolution of multiple video frames. In such an example, the MobileNetV2 network (the model decision engine 406) can be the least computationally intensive, the Resnet-50 network (the model 431) can be more computationally intensive than MobileNetV2 but less than Slowfast, and Slowfast (the model 433) can be the most computationally intensive. Examples of the situations (e.g., based on the types of content in the input video 402 or portion thereof) in which the model decision engine 406 may select each of the available feature extraction models (e.g., feature extraction portion 429 and first and second feature extraction models 431, and 433) are described above with respect to FIG. 1.

Figure 5:
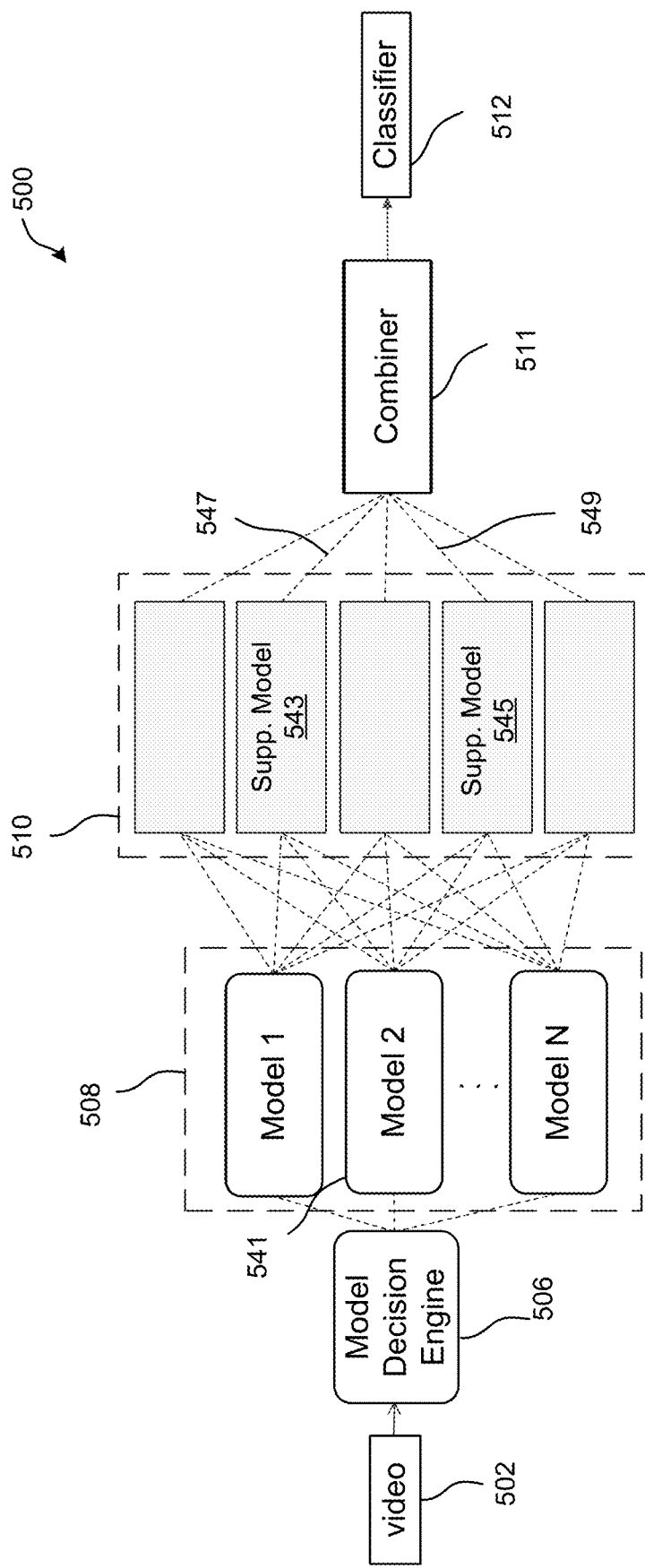
FIG. 5 is a block diagram illustrating another example of a holistic video understanding system, in accordance with some examples.

FIG. 5 is a diagram illustrating a holistic video understanding system 500. As shown, the components of the holistic video understanding system 500 include a model decision engine 506, a feature extraction models 508, supplemental models 510, a combiner 511, and a classifier 512. One or more components of the holistic video understanding system 500 of FIG. 5 can be similar to and perform similar operations as like components of the holistic video understanding system 100 of FIG. 1 and/or any of the other examples of holistic video understanding systems described herein. For example, the feature extraction models 508, the supplemental models 510, and the classifier 512 can be similar to and perform similar operations as the feature extraction models 108, supplemental models 110, and output classifier 112 of FIG. 1. An input video 502 can be processed by the model decision engine 506. Referring to FIG. 1 as an example, the input video 502 can be retrieved from the video retriever 102 or from the storage device 104. As shown in FIG. 4, the example holistic video understanding system 400 includes a one-to-one (1:1) relationship between feature extraction models 408 and supplemental models 410. The holistic video understanding system 500 of FIG. 5 illustrates a configuration where each feature extraction model of the feature extraction models 508 can have a 1-to-many (1:many) or many-to-many (many:many) relationship with the supplemental models 510.

In some examples, the model decision engine 506 can be trained to determine which feature extraction model(s) 508 will be used to process the input video 502 or video portion. The model decision engine 506 can also be trained to determine which supplemental model(s) from the supplemental models 510 to apply to the features generated by the feature extraction model(s) (selected from the feature extracting models 508) to achieve a target objective. One example of a target object is to achieve an optimal balance between efficiency and accuracy. In some examples, each pairing of a selected feature extraction model (from the feature extraction models 508) with a selected supplemental model (from the supplemental models 510) can be similar to one of the video processing models 313A, 313B, through 313M of FIG. 3.

The holistic video understanding system 500 can be trained using the three-step training process described above. For example, the model decision engine 506 can be trained in the third step after the feature extraction models 508 and the supplemental models 510 are trained (with fixed or frozen weights after training), as described above. During inference (e.g., after the model decision engine 506 has been trained), the model decision engine 506 can determine, based on the input video 502 or a portion of the input video 502 (e.g., a clip $v_{ij}$ of the input video 502), which feature extraction model(s) from the feature extraction models 508 and which supplemental model(s) from the supplemental models 510 will be used to process the input video 502 or video portion.

In some implementations, the model decision engine 506 can output a classification that allows for the selection of a single feature extraction model 508 paired with one or more supplemental models from the supplemental models 510. In one example, the model decision engine can select O (where O is one or more, two or more, or other number of) supplemental models to process the output of a feature extraction model from the feature extraction models 508. In such an example, each one of the O supplemental models from the supplemental models 510 can receive features extracted by the selected feature extraction model from the feature extraction models 508.

Each supplemental model of the O supplemental models can process the features and can produce an output, resulting in 0 total outputs (e.g., feature vectors) from the O supplemental models. In some examples, the combiner 511 can receive the O outputs and can combine the O outputs into a single output (e.g., a single feature vector). In one illustrative example, the combiner 511 can average the O outputs to combine the O outputs into the single output that can be provided to the classifier 512 for classifying the input video 502 or video portion. In one illustrative example, the combiner 511 can concatenate the O outputs to combine the O outputs into the single output, which can then be provided to the classifier 512 for classifying the input video 502 or video portion.

FIG. 5 highlights an illustrative case where the model decision engine 506 selects a single feature extraction model (e.g., the feature extraction model 541) from the feature extraction models 508. The features from the selected feature extraction model 541 are received by two selected supplemental models (e.g., supplemental model 543 and supplemental model 545) from the supplemental models 510. Further, in such an illustrative example, the output 547 of the selected supplemental model 543 and the output 549 of the selected supplemental model 545 are received by the combiner 511. As described above, the combiner 511 can combine the two outputs 547 and 549 (e.g., by averaging the values of the feature vectors associated with the outputs 547 and 549, by concatenating the values of the feature vector associated with the output 547 and the values of the feature vector associated with the output 549, or otherwise combining the outputs 547 and 549).

In some examples, the model decision engine 506 can output a one-hot classification (e.g., selecting a single feature extraction model 508 paired with a single supplemental model 510) for processing the input video 502. In some implementations, when only one supplemental model from the supplemental models 510 produces an output, the combiner 511 can pass the output directly (without altering the output) to the classifier 512 for classification.

Figure 6:
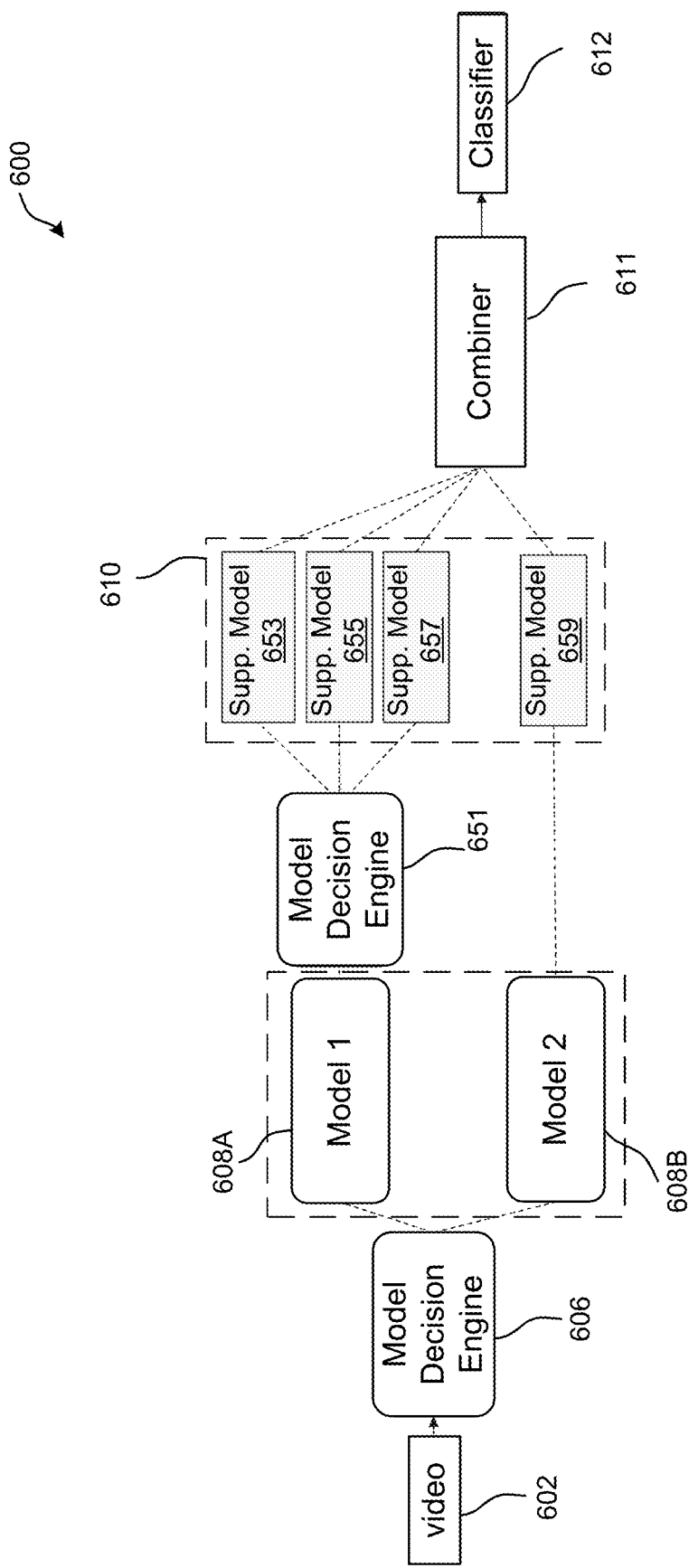
FIG. 6 is a block diagram illustrating another example of a holistic video understanding system, in accordance with some examples.

FIG. 6 is a diagram illustrating another example of a holistic video understanding system 600. As shown, the components of the holistic video understanding system 600 include a model decision engine 606, feature extraction models, supplemental models 610, a combiner 611, a classifier 612, and a second supplemental model decision engine 651. As shown, the feature extraction models include a first feature extraction model 608A and a second feature extraction model 608B. The supplemental models 610 include a first supplemental model 653, a second supplemental model 655, a third supplemental model 657, and a fourth supplemental model 659. One or more components of the holistic video understanding system 600 of FIG. 6 can be similar to and perform similar operations as like components of the holistic video understanding system 100 of FIG. 1 and/or any of the other examples of holistic video understanding systems described herein. For example, the model decision engine 606, the feature extraction models 608A and 608B, the supplemental models 610, and the classifier 612 can be similar to and perform similar operations as the feature extraction models 108, the supplemental models 110, and the output classifier 112 of FIG. 1. In some cases, the combiner 611 of the holistic video understanding system 600 of FIG. 6 can be similar to and perform similar operations as the combiner 511 of the holistic video understanding system 500 of FIG. 5.

An input video 602 can be processed by the model decision engine 606. Referring to FIG. 1 as an example, the input video 602 or a video portion can be retrieved from the video retriever 102 or storage device 104. FIG. 6 introduces the concept of a secondary model decision engine 651, which can be disposed between the feature extraction models 608A and 608B and the supplemental models 610. As shown, the secondary model decision engine 651 can receive features from the first feature extraction model 608A. The secondary model decision engine 651 can be trained to determine which supplemental model(s) from the supplemental models 610 that are coupled to the first feature extraction model 608A (e.g., supplemental models 653, 655, and 657) to use for processing the features generated by the first feature extraction model 608A. In some cases, the model decision engine 651 can be trained to determine which of the supplemental models 653, 655, and 657 to use for further processing the features of the first feature extraction model 608A based on a desired combination of computational efficiency and accuracy.

During inference (after the secondary model decision engine 651 has been trained), the secondary model decision engine 651 can receive features from the first feature extraction model 608A based on a decision by the model decision engine 606. In one example, based on characteristics of the features received from the first feature extraction model 608A, the secondary model decision engine 651 can determine which one or more of the supplemental models 653, 655, and/or 657 should be used to further process the features from the first feature extraction model 608A. In some examples, the secondary model decision engine 651 can select two or more of the supplemental models 653, 655, and/or 657. In one illustrative example, the secondary model decision engine 651 can select supplemental models 653 and 655. In such an example, the selected supplemental models 653 and 655 can each receive the features extracted from the input video 602 by the first feature extraction model 608A, process the received features, and provide the respective outputs to the combiner 611. The combiner 611 can combine the received outputs from the supplemental models 653 and 655 (e.g., by averaging the outputs, concatenating the outputs, or otherwise combining the outputs). The combiner 611 can pass the combined output to the classifier 612 for classification of the video or video portion.

In another example where the model decision engine 606 selects the second feature extraction model 608B to extract features from the input video 602 or video portion, the model decision engine 651 can perform no action for the input video 602 or video portion. In such an example, features generated by the second feature extraction model 608B can be output to the supplemental model 659 for further processing. The supplemental model 659 can provide its output to the combiner 611. The combiner 611 can then forward the output to the classifier 612 for classification of the input video 602 or video portion.

It should be understood by a person skilled in the art that the principle of utilizing a secondary model decision engine 651 is not limited to the specific topology of two feature extraction models 608A and 608B, with three supplemental models 653, 655, 657 configured to receive inputs from the first feature extraction model 608A and one supplemental model 659 coupled to receive inputs from the second feature extraction model 608B. Any other suitable configuration can be used in conjunction with the model decision engine 651. For instance, in some cases, a secondary model decision engine 651 can be used in any configuration where there are at least two supplemental models that can be used to process features generated by one of the feature extraction models 608A and 608B. In some examples, multiple secondary model decision engines 651 can be used where more than one of the feature extraction models 608A and 608B are coupled to two or more supplemental models 610.

Figure 7:
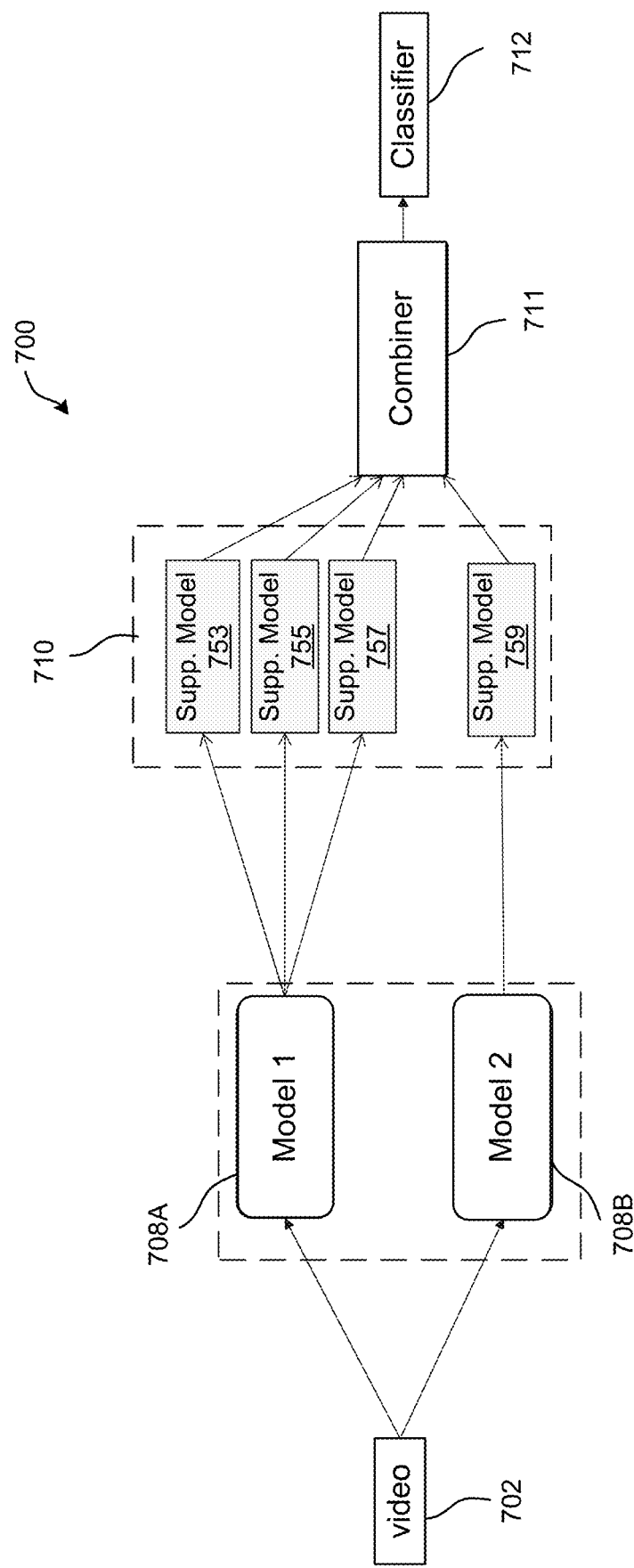
FIG. 7 is a block diagram illustrating another example of a holistic video understanding system, in accordance with some examples.

FIG. 7 is a diagram illustrating an alternative configuration for a holistic video understanding system 700. As shown, the components of the holistic video understanding system 700 include a feature extraction models, supplemental models 710, a combiner 711, and a classifier 712. The feature extraction models include a first feature extraction model 708A and a second feature extraction model 708B. The supplemental models 710 include a first supplemental model 753, a second supplemental model 755, a third supplemental model 757, and a fourth supplemental model 759. Components of the holistic video understanding system 700 of FIG. 7 can be similar to and perform similar operations as like components of the holistic video understanding system 600 of FIG. 6 and/or any of the other examples of holistic video understanding systems described herein. For example, each component of the holistic video understanding system 700 can be similar to and perform similar operations as the corresponding component of FIG. 6. The holistic video understanding system 700 of FIG. 7 does not include a model decision engine (e.g., the model decision engine 606) or a secondary model decision engine (e.g., the secondary model decision engine 651), instead utilizing both available feature extraction models 708A and 708B and corresponding supplemental models 753, 755, 757, and 759 to process the input video 702 or video portion.

An input video 702 can be processed by the first feature extraction model 708A and the second feature extraction model 708B. Referring to FIG. 1 as an example, the input video 702 can be retrieved from the video retriever 102 or storage device 104. The supplemental models 753, 755, and 757 can process the features (e.g., one or more feature vectors) output by the first feature extraction model 708A. The supplemental model 759 can process the feature or features (e.g., a feature vector) output by the first feature extraction model 708B. In the example of FIG. 7, the combiner 711 combines (e.g., by averaging, concatenating, etc.) all of the outputs of the supplemental models 753, 755, 757, and 759 and provides the combined output to the classifier 712. The classifier 712 can classify the input video 702 or video portion based on the output (e.g., a combined feature vector) from the combiner 711.

In the configuration of FIG. 7, processing the input video 702 through all available paths (e.g., through all of the feature extraction models and all of the supplemental models 710) occurs regardless of the characteristics of the input video. The holistic video understanding system 700 illustrated in FIG. 7 is holistic in the sense that multiple feature extraction models (e.g., feature extraction model 708A and feature extraction model 708B) and multiple supplemental models 710 (which can each apply different inductive biases as described with regard to FIG. 1 above) can be applied, as compared to applying a single fixed model to the input video 702.

Table 2 below shows experimental results comparing two configurations that utilized the four models 2-5 shown above in Table 1 and described thereafter. Table 2 compares the potential performance (measured in mAP) of using a model decision engine to select between models against a strategy of averaging results from multiple models. For instance, the first row of Table 2 illustrates experimental results for a configuration similar to the holistic video understanding system 700 of FIG. 7, which processed input videos through all four models 2-5 simultaneously. The combiner 711 of FIG. 7 averaged the outputs of the four models 2-5. In the experiment, the combined outputs were classified by the classifier 712 of FIG. 7

TABLE 2

| Model | Average | Action | Attribute | Concept | Event | Object | Scene |
|---|---|---|---|---|---|---|---|
| Averaging | 55.1 | 63.6 | 46.0 | 53.5 | 58.5 | 54.3 | 54.3 |
| Model Decision Engine | 57.0 | 62.4 | 47.8 | 56.4 | 61.3 | 57.2 | 56.9 |

The second row of Table 2 illustrates experimental results for selecting the best model or subset of models for processing each input video or video portion based on experimental data about which model(s) provide the best accuracy. The values in the second row of Table 2 were obtained by selecting one or more of the models averaged in row 1 for each input video or video portion. As shown in the second row of Table 2, the average accuracy and accuracy across individual categories (e.g., action, concept, event, object, and scene) improved relative to the averaging shown in the first row. Table 2 illustrates that utilizing a model decision engine as described in this disclosure (e.g., model decision engine 106 in FIG. 1) can improve accuracy relative to an approach of picking all models and averaging the result.

Figure 8:
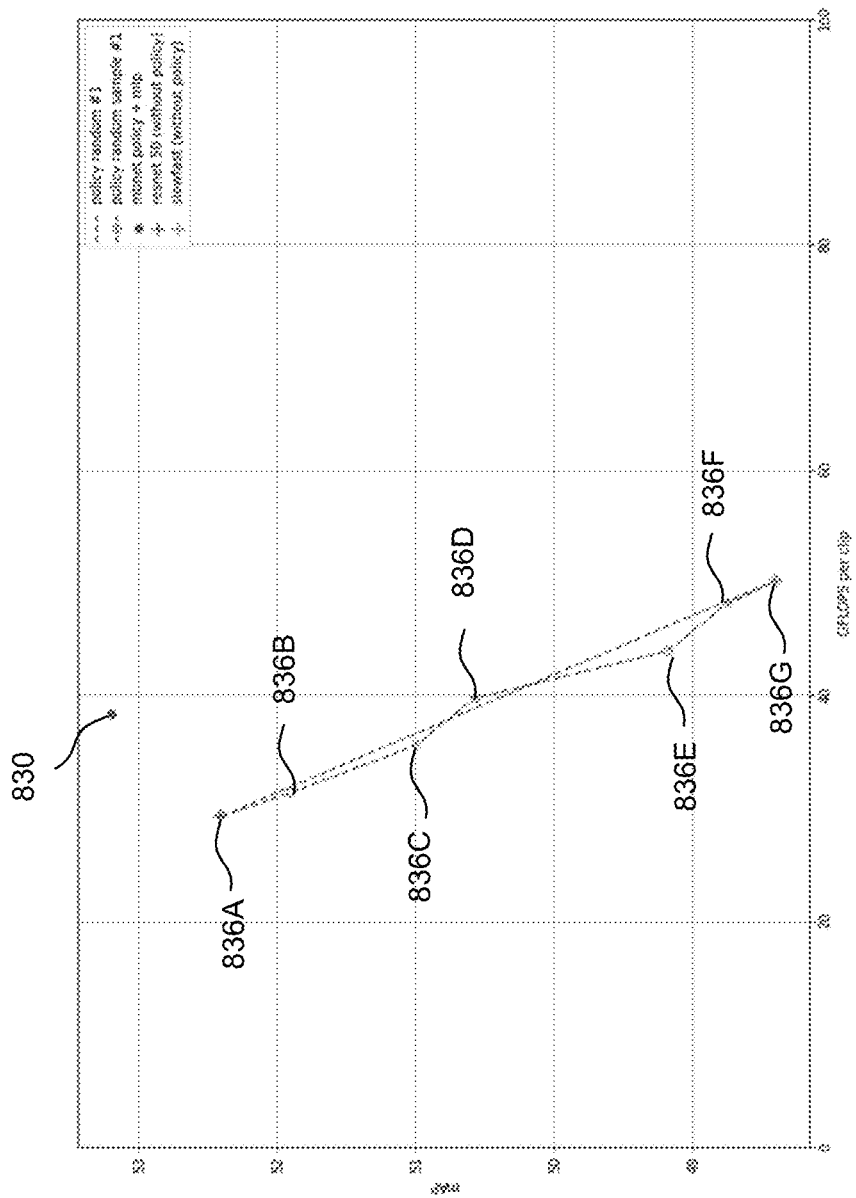
FIG. 8 is a plot illustrating a performance of the example holistic video understanding system, in accordance with some examples.

FIG. 8 illustrates an experimental plot of the relative performance of the holistic video understanding system 600 using a model decision engine 606 with reference to FIG. 6 compared to approaches that utilize only fixed models and to an approach that randomly selects between processing paths (e.g., each path can be represent a pairing of a feature extraction model and a supplemental model). The mAP for the experimental results is plotted on the vertical axis, and the computational effort measured in GFLOPs per clip is plotted on the horizontal axis. In an experiment associated with the plot in FIG. 8, the model decision engine 106 was implemented using MobileNetV2. In the experiment, each configuration described herein was tested using the same video dataset. A 2D CNN implemented using Resnet-50 was used as the first feature extraction model 608A. The second model decision engine 651 was set to apply all three supplemental models 653, 655, and 657 to the output of the first feature extraction model 608A. For instance, whenever the model decision engine 106 selected the first feature extraction model 608A to process a video (or portion of a video, such as a video clip $v_{ij}$), the features generated by the feature extraction model 608A were processed through all three of the supplemental models 653, 655, and 657. The combiner 611 combined the outputs from the three supplemental models (e.g., by averaging, concatenating, or otherwise combining the features from the supplemental models). The combiner 611 provided the combined output to the classifier 612 for classification. In the experiment, a 1D convolution over the temporal dimension (as described with regard to FIG. 2A and FIG. 2B) was used for the supplemental model 653, a non-local temporal model was used for the supplemental model 655, and a graph convolution was used for the supplemental model 657. The a 3D CNN implemented using the Slowfast model was used for the second feature extraction model 608B, and an MLP was used as the supplemental model 659. In the experiment, whenever the model decision engine 606 selected the second feature extraction model 608B to process a video (or portion of the video), the features of the second feature extraction model 608B were input into the supplemental model 659, the combiner 611 did not perform any operation (because only a single result was passed to its input), and the output of the supplemental model 659 was classified by the classifier 612.

The data points 836A and 836G in the plot of FIG. 8 illustrate the result of using the model decision engine 106 to choose between the first feature extraction model 608A and the second feature extraction model 608B. For instance, the data point 836A represents the result of the model decision engine 606 always selecting the first feature extraction model 608A, and the data point 836G represents the result of the model decision engine 106 always selecting the second feature extraction model 608B. The group of data points 836A, 836B, 836C, 836D, 836E, 836F, and 836G represent the results of randomly selecting between the first feature extraction model 608A and the second feature extraction model 608B according to the proportions [0.0, 0.1, 0.3, 0.5, 0.7, 0.9, 1.0], respectively, where 0.0 represents always selecting the first feature extraction model 608A, and 1.0 represents always selecting the second feature extraction model 608B. As shown, the mAP for the data point 830 exceeds both the data point 836A and 836G, showing that using the model decision engine 106 improves accuracy over using either the first feature extraction model 608A or the second feature extraction model 608B exclusively. Based on the improved accuracy on average, the plot in FIG. 8 shows that the model decision engine 106 picks the model based on the visual or temporal features of the video.

As noted above, the holistic video understanding systems (e.g., the holistic video understanding system 100, 300, 400, 500, and/or 600) and related techniques described herein can allow a system to adaptively select among video processing machine learning models to efficiently and accurately classify video content across multiple categories (e.g., actions, attributes, events, objects, and scenes). For instance, using the holistic video understanding system 100, a first video portion containing a static scene can be analyzed by a 2D CNN to extract spatial features for detecting objects in the scene from the first video portion, and a second video portion containing a sporting event can be analyzed by a 3D CNN to extract spatial and temporal features to detect objects and actions associated with those objects from the second video portion. By utilizing a model decision engine 106 to select a feature extraction model (from the feature extraction models 108) that is suitable for the characteristics of the relevant video portion (e.g., the type of information, motion, etc. of the relevant video portion) and that is less computationally intensive that other available feature extraction models 108, the computing and power resources of a system (e.g., a computing system) can be conserved for other operations. In addition to saving computing and power resources of the system, including a variety of supplemental models 110 with different inductive biases can make the holistic video understanding system 100 more holistic by providing models that specialize in recognizing a broader variety of categories. In comparison, systems that include a fixed model for all input videos may perform well when the video being analyzed contains categories of data that the fixed model is optimized to detect, but may lose accuracy and/or expend unnecessary computational effort when the video being analyzed contained different categories of information.

Figure 9:
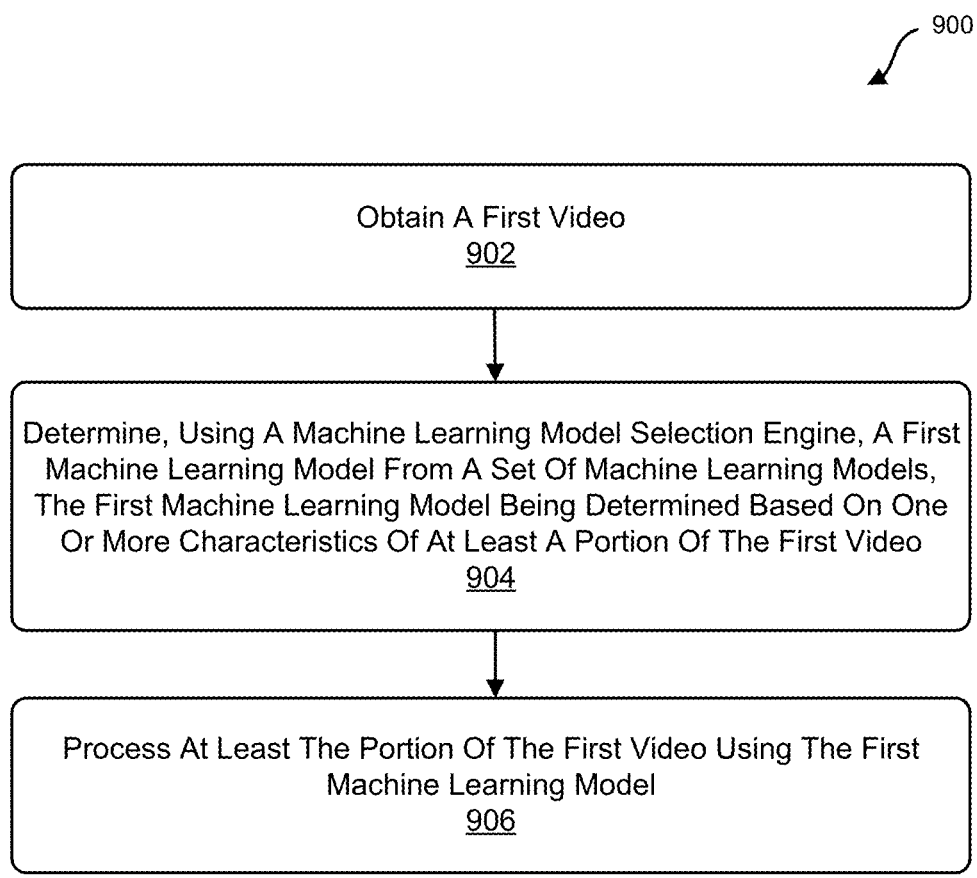
FIG. 9 is a flow diagram illustrating an example of a process for processing video data, in accordance with some examples.

FIG. 9 is a flow diagram illustrating an example of a process 900 of processing a video using a holistic video understanding system, according to some examples. At block 902, the process 900 includes obtaining a first video. In some examples, the process 900 can obtain the first video from a storage device. In one illustrative example, the storage device includes the storage device 104 shown in FIG. 1 and/or storage device 1230 shown in FIG. 12.

At block 904, the process 900 includes determining, using a machine learning model decision engine, a first machine learning model from a set of machine learning models (e.g., to use for processing at least a portion of the first video). The first machine learning model can be determined based on one or more characteristics of at least the portion of the first video. In one illustrative example, the model decision engine includes model decision engine 106 shown in FIG. 1. In some examples, the model decision engine includes a neural network (e.g., the MobileNetV2 neural network and/or the Resnet-50 neural network). In one illustrative example, the set of machine learning models includes feature extraction models 108 shown in FIG. 1. In another illustrative example, the set of machine learning models includes models 313A, 313B, through 313M shown in FIG. 3.

In some examples, the first machine learning model includes a convolutional neural network (CNN), as described above. For instance, in some examples, the CNN includes a two-dimensional CNN (e.g., MobileNetV2 or Resnet-50), a three-dimensional CNN (e.g., Slowfast), or other CNN. In some cases, the first machine learning model may include a first type of CNN, different from CNNs included in at least some of the other machine learning models in the set of machine learning models. In some examples, the one or more characteristics of at least the portion of the first video include spatial, temporal, and/or audio characteristics.

At block 906, the process 900 includes processing at least the portion of the first video using the first machine learning model. As described herein, processing the at least the portion of the first video can include extracting features from the at least the portion of the first video, processing features using one or more supplemental models, and classifying at least the portion of the first video, among other processing.

In some examples, the process 900 can include determining a classification of at least the portion of the first video based on processing at least the portion of the first video using the first machine learning model. In some examples, classes determined during classification can include playing soccer, playing violin, listening to music, among others. In one illustrative example, the output classifier 112 shown in FIG. 1 determines the classification. In some examples, the process 900 includes determining a classification that identifies multiple classes included in at least the portion of the first video, as described above.

In some examples, process 900 includes extracting, using the first machine learning model, first one or more features from at least the portion of the first video. In some cases, the first machine learning model includes a neural network, such as a two-dimensional (2D) CNN. In such cases, the 2D CNN can extract first one or more features from at least the portion of the first video in two spatial dimensions. In some implementations, the first machine learning model includes a 3D CNN. In such implementations, the 3D CNN can extract first one or more features from at least the portion of the video in two spatial dimensions and a temporal dimension.

The process 900 can include processing, using a first supplemental model, the first one or more features extracted from at least the portion of the first video by the first machine learning model. In one illustrative example, the first supplemental model includes a supplemental model included in the supplemental models 110 shown in FIG. 1. In some cases, the first supplemental model includes a neural network, such as a one-dimensional (1D) CNN. For instance, when the first supplemental model includes a 1D CNN, the first one or more features can include a first feature vector based on a first frame and a second feature vector based on a second frame of at least the portion of the first video. In such a case, the 1D CNN can generate temporal information of at least the portion of the first video from at least the first feature vector and the second feature vector. In one illustrative example, the 1D CNN performs the convolution illustrated in FIG. 2D and described above. In some cases, the first supplemental model includes a multi-layer perceptron. In some implementations, the first supplemental model includes a graph convolutional network. In some cases, the first supplemental model includes a non-local model. In some examples, process 900 includes determining, based on processing the first one or more features using the first supplemental model, a first classification of at least the portion of the first video.

In some examples, process 900 includes determining, using the machine learning model decision engine, a second machine learning model from the set of machine learning models (e.g., to use for processing at least another portion of the first video). The second machine learning model can be determined based on one or more characteristics of the at least another portion of the first video. In some cases, process 900 includes processing the at least another portion of the first video using the second machine learning model. In one aspect, the second machine learning model can include a different neural network (e.g., CNN) from one or more neural networks (e.g., CNNs) of the first machine learning model. In some cases, process 900 includes extracting, using the second machine learning model, second one or more features from the at least another portion of the first video. The process 900 can include processing, using a second supplemental model, the second one or more features extracted from the at least another portion of the first video by the second machine learning mode. In some examples, process 900 can determine a second classification of the at least another portion of the first video based on the one or more features from the second supplemental model.

In some examples, the process 900 can obtain a second video. The process 900 can determine a second machine learning model (e.g., to use for processing at least a portion of the second video). The second machine learning model can be determined based on one or more characteristics of at least the portion of the second video. In some examples, the process 900 can obtain the second video from a storage device. In one illustrative example, the storage device includes the storage device 104 shown in FIG. 1 and/or storage device 1230 shown in FIG. 12. The process 900 can process at least the portion of the second video using the second machine learning model.

In some examples, the process 900 includes extracting, using the first machine learning model, first one or more features from at least the portion of the first video in parallel with determining the first machine learning model from the set of machine learning models to use for processing at least the portion of the first video. In some cases, the machine learning model decision engine shares a common neural network with the first machine learning model. In one illustrative example, the model decision engine that shares a common neural network with the first machine learning model can include model decision engine 406 and feature extraction component 429, as shown in FIG. 4.

In some examples, the processes described herein (e.g., process 900 and/or other process described herein) may be performed by a computing device or apparatus. In one example, one or more of the processes can be performed by the holistic video understanding system 100 of FIG. 1. In another example, one or more of the processes can be performed by the computing system 1200 shown in FIG. 12. For instance, a computing device with the computing system 1200 shown in FIG. 12 can include the components of the holistic video understanding system 100 and can implement the operations of the process 900 of FIG. 9 and/or other process described herein.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a vehicle or a computing device of a vehicle (e.g., a driver monitoring system (DMS) of a vehicle), a server computer, a robotic device, a television, and/or any other computing device with the resource capabilities to perform the processes described herein, including the process 900 and/or other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 900 illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 900 and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 10:
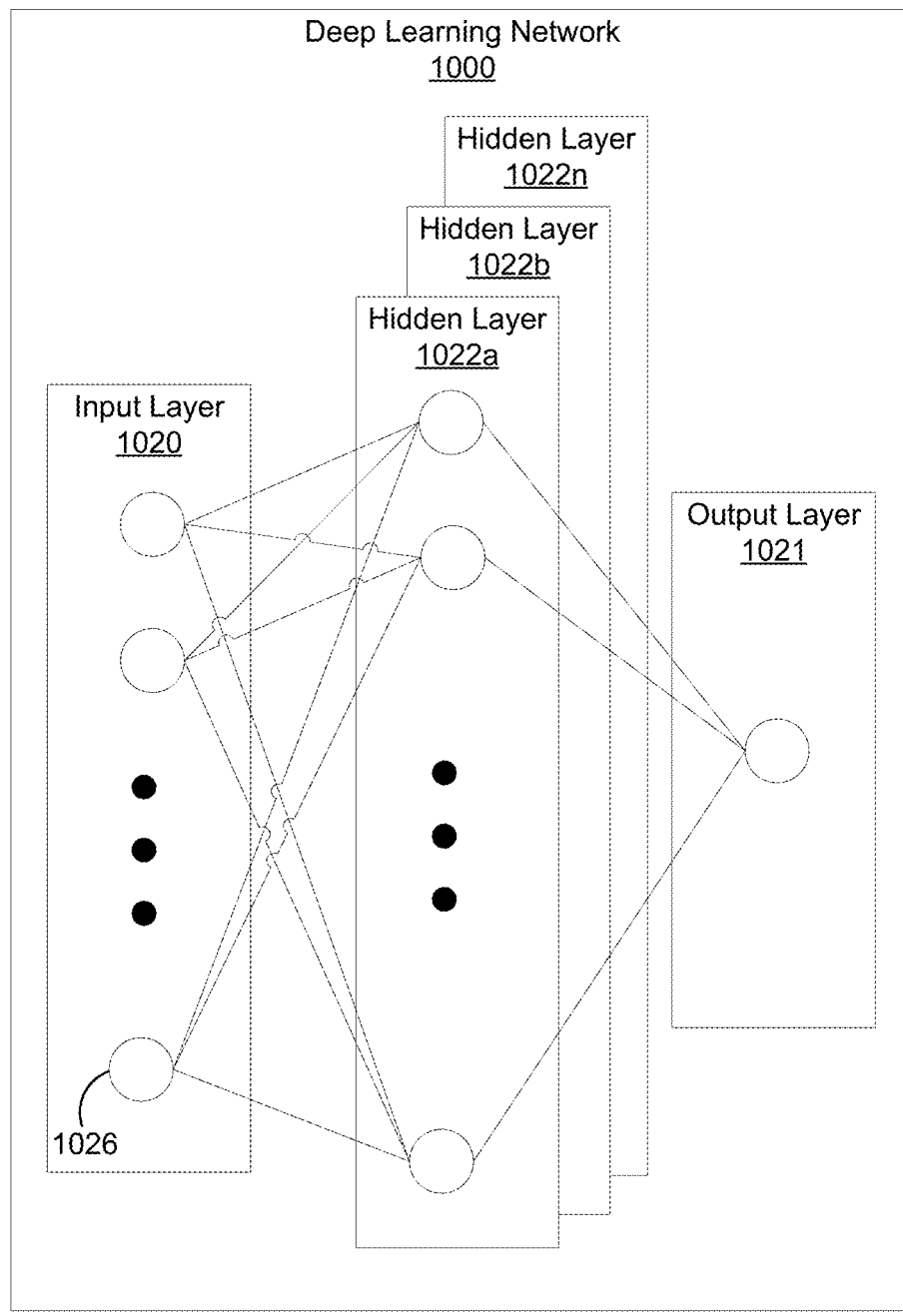
FIG. 10 is a block diagram illustrating an example of a deep learning network, in accordance with some examples.

As noted above, various aspects of the present disclosure can use machine learning models or systems. FIG. 10 is an illustrative example of a deep learning neural network 1000 that can be used to implement the holistic video understanding system described above. An input layer 1020 includes input data. In one illustrative example, the input layer 1020 can include data representing the pixels of an input video frame. The neural network 1000 includes multiple hidden layers 1022a, 1022b, through 1022n. The hidden layers 1022a, 1022b, through 1022n include "n" number of hidden layers, where "n" is an integer greater than or equal to one. The number of hidden layers can be made to include as many layers as needed for the given application. The neural network 1000 further includes an output layer 1021 that provides an output resulting from the processing performed by the hidden layers 1022a, 1022b, through 1022n. In one illustrative example, the output layer 1021 can provide a classification for an object in an input video frame. The classification can include a class identifying the type of activity (e.g., playing soccer, playing piano, listening to piano, playing guitar, etc.).

The neural network 1000 is a multi-layer neural network of interconnected nodes. Each node can represent a piece of information. Information associated with the nodes is shared among the different layers and each layer retains information as information is processed. In some cases, the neural network 1000 can include a feed-forward network, in which case there are no feedback connections where outputs of the network are fed back into itself. In some cases, the neural network 1000 can include a recurrent neural network, which can have loops that allow information to be carried across nodes while reading in input.

Information can be exchanged between nodes through node-to-node interconnections between the various layers. Nodes of the input layer 1020 can activate a set of nodes in the first hidden layer 1022a. For example, as shown, each of the input nodes of the input layer 1020 is connected to each of the nodes of the first hidden layer 1022a. The nodes of the first hidden layer 1022a can transform the information of each input node by applying activation functions to the input node information. The information derived from the transformation can then be passed to and can activate the nodes of the next hidden layer 1022b, which can perform their own designated functions. Example functions include convolutional, up-sampling, data transformation, and/or any other suitable functions. The output of the hidden layer 1022b can then activate nodes of the next hidden layer, and so on. The output of the last hidden layer 1022n can activate one or more nodes of the output layer 1021, at which an output is provided. In some cases, while nodes (e.g., node 1026) in the neural network 1000 are shown as having multiple output lines, a node has a single output and all lines shown as being output from a node represent the same output value.

In some cases, each node or interconnection between nodes can have a weight that is a set of parameters derived from the training of the neural network 1000. Once the neural network 1000 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 1000 to be adaptive to inputs and able to learn as more and more data is processed.

The neural network 1000 is pre-trained to process the features from the data in the input layer 1020 using the different hidden layers 1022a, 1022b, through 1022n in order to provide the output through the output layer 1021. In an example in which the neural network 1000 is used to identify activities being performed by a driver in frames, the neural network 1000 can be trained using training data that includes both frames and labels, as described above. For instance, training frames can be input into the network, with each training frame having a label indicating the features in the frames (for the feature extraction machine learning system) or a label indicating classes of an activity in each frame. In one example using object classification for illustrative purposes, a training frame can include an image of a number 2, in which case the label for the image can be [0 0 1 0 0 0 0 0 0 0].

In some cases, the neural network 1000 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training images until the neural network 1000 is trained well enough so that the weights of the layers are accurately tuned.

For the example of identifying objects in frames, the forward pass can include passing a training frame through the neural network 1000. The weights are initially randomized before the neural network 1000 is trained. As an illustrative example, a frame can include an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (e.g., red, green, and blue, or luma and two chroma components, or the like).

As noted above, for a first training iteration for the neural network 1000, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network

1000 is unable to determine low level features and thus cannot make an accurate determination of what the classification of the object might be. A loss function can be used to analyze error in the output. Any suitable loss function definition can be used, such as a Cross-Entropy loss. Another example of a loss function includes the mean squared error (MSE), defined as $E_{total}=\Sigma\frac{1}{2}(target-output)^2$. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1000 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 1000 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 1000 can include any other deep network other than a CNN, such as an autoencoder, a deep belief nets (DBNs), a Recurrent Neural Networks (RNNs), among others.

Figure 11:
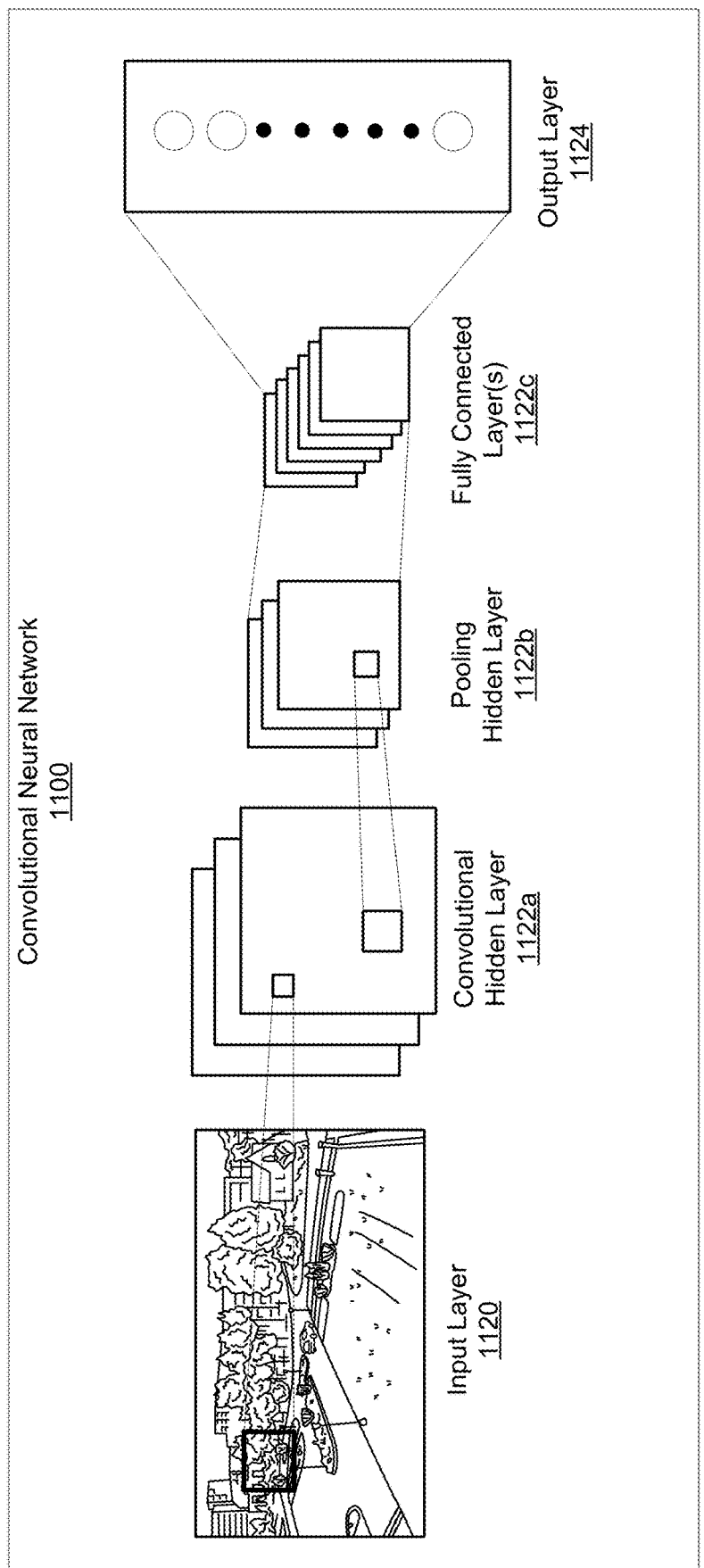
FIG. 11 is a block diagram illustrating an example of a convolutional neural network, in accordance with some examples.

FIG. 11 is an illustrative example of a convolutional neural network (CNN) 1100. The input layer 1120 of the CNN 1100 includes data representing an image or frame. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1122a, an optional non-linear activation layer, a pooling hidden layer 1122b, and fully connected hidden layers 1122c to get an output at the output layer 1124. While only one of each hidden layer is shown in FIG. 11, one of ordinary skill will appreciate that multiple convolutional hidden layers, non-linear layers, pooling hidden layers, and/or fully connected layers can be included in the CNN 1100. As previously described, the output can indicate a single class of an object or can include a probability of classes that best describe the object in the image.

The first layer of the CNN 1100 is the convolutional hidden layer 1122a. The convolutional hidden layer 1122a analyzes the image data of the input layer 1120. Each node of the convolutional hidden layer 1122a is connected to a region of nodes (pixels) of the input image called a receptive field. The convolutional hidden layer 1122a can be considered as one or more filters (each filter corresponding to a different activation or feature map), with each convolutional iteration of a filter being a node or neuron of the convolutional hidden layer 1122a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1122a. Each connection between a node and a receptive field for that node learns a weight and, in some cases, an overall bias such that each node learns to analyze its particular local receptive field in the input image. Each node of the hidden layer 1122a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1122a is due to each node of the convolutional layer being applied to its corresponding receptive field. For example, a filter of the convolutional hidden layer 1122a can begin in the top-left corner of the input image array and can convolve around the input image. As noted above, each convolutional iteration of the filter can be considered a node or neuron of the convolutional hidden layer 1122a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1122a. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1122a.

The mapping from the input layer to the convolutional hidden layer 1122a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 1122a can include several activation maps in order to identify multiple features in an image. The example shown in FIG. 11 includes three activation maps. Using three activation maps, the convolutional hidden layer 1122a can detect three different kinds of features, with each feature being detectable across the entire image.

In some examples, a non-linear hidden layer can be applied after the convolutional hidden layer 1122a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1100 without affecting the receptive fields of the convolutional hidden layer 1122a.

The pooling hidden layer 1122b can be applied after the convolutional hidden layer 1122a (and after the non-linear hidden layer when used). The pooling hidden layer 1122b is used to simplify the information in the output from the convolutional hidden layer 1122a. For example, the pooling hidden layer 1122b can take each activation map output from the convolutional hidden layer 1122a and generates a condensed activation map (or feature map) using a pooling function. Max-pooling is one example of a function performed by a pooling hidden layer. Other forms of pooling functions be used by the pooling hidden layer 1122a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1122a. In the example shown in FIG. 11, three pooling filters are used for the three activation maps in the convolutional hidden layer 1122a.

In some examples, max-pooling can be used by applying a max-pooling filter (e.g., having a size of 2×2) with a stride (e.g., equal to a dimension of the filter, such as a stride of 2) to an activation map output from the convolutional hidden layer 1122a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1122a having a dimension of 24×24 nodes, the output from the pooling hidden layer 1122b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1100.

The final layer of connections in the network is a fully-connected layer that connects every node from the pooling hidden layer 1122b to every one of the output nodes in the output layer 1124. Using the example above, the input layer includes 28×28 nodes encoding the pixel intensities of the input image, the convolutional hidden layer 1122a includes 3×24×24 hidden feature nodes based on application of a 5×5 local receptive field (for the filters) to three activation maps, and the pooling hidden layer 1122b includes a layer of 3×12×12 hidden feature nodes based on application of max-pooling filter to 2×2 regions across each of the three feature maps. Extending this example, the output layer 1124 can include ten output nodes. In such an example, every node of the 3×12×12 pooling hidden layer 1122b is connected to every node of the output layer 1124.

The fully connected layer 1122c can obtain the output of the previous pooling hidden layer 1122b (which should represent the activation maps of high-level features) and determines the features that most correlate to a particular class. For example, the fully connected layer 1122c layer can determine the high-level features that most strongly correlate to a particular class, and can include weights (nodes) for the high-level features. A product can be computed between the weights of the fully connected layer 1122c and the pooling hidden layer 1122b to obtain probabilities for the different classes. For example, if the CNN 1100 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1124 can include an M-dimensional vector (in the prior example, M=10). M indicates the number of classes that the CNN 1100 has to choose from when classifying the object in the image. Other example outputs can also be provided. Each number in the M-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 12:
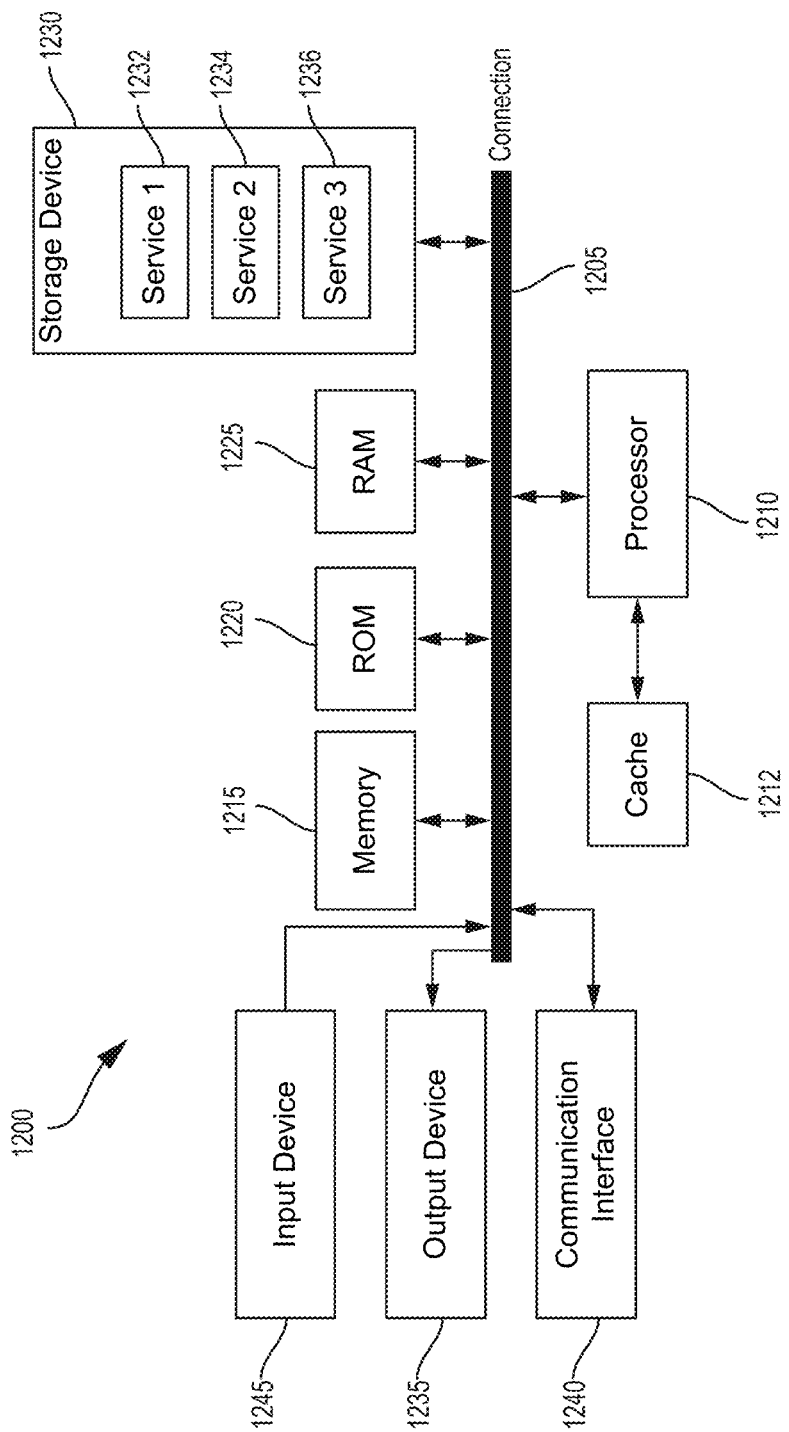
FIG. 12 is a diagram illustrating an example of a computing system for implementing certain aspects described herein.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of processing video data, the method comprising: obtaining a first video; determining, using a machine learning model decision engine, a first machine learning model from a set of machine learning models (e.g., to use for processing at least a portion of the first video), the first machine learning model being determined based on one or more characteristics of at least a portion of the first video; and processing at least the portion of the first video using the first machine learning model.

Aspect 2: The method of aspect 1, further comprising: determining a classification of at least the portion of the first video based on processing at least the portion of the first video using the first machine learning model.

Aspect 3: The method of any one of aspects 1 or 2, further comprising: extracting, using the first machine learning model, first one or more features from at least the portion of the first video; processing, using a first supplemental model, the first one or more features; and determining, based on processing the first one or more features using the first supplemental model, a first classification of at least the portion of the first video.

Aspect 4: The method of any one of aspect 3, wherein: the first supplemental model includes a one-dimensional convolutional neural network; the first one or more features includes a first feature vector based on a first frame of at least the portion of the first video and a second feature vector based on a second frame of at least the portion of the first video; and the first supplemental model generates temporal information of at least the portion of the first video from at least the first feature vector and the second feature vector.

Aspect 5: The method of any one of aspects 3 or 4, wherein the first supplemental model includes a multilayer perceptron.

Aspect 6: The method of any one of aspects 3 to 5, wherein the first supplemental model includes a graph convolutional network.

Aspect 7: The method of any one of aspects 3 to 6, wherein the first supplemental model includes a non-local model.

Aspect 8: The method of any one of aspects 1 to 7, further comprising: determining, using the machine learning model decision engine, a second machine learning model from the set of machine learning models, the second machine learning model being determined based on one or more characteristics of at least another portion of the first video; and processing the at least another portion of the first video using the second machine learning model.

Aspect 9: The method of aspect 8, further comprising: extracting, using the second machine learning model, second one or more features from the at least another portion of the first video; processing, using a second supplemental model, the second one or more features; and determining, based on processing the second one or more features using the second supplemental model, a second classification of the at least another portion of the first video.

Aspect 10: The method of any one of aspects 1 to 9, wherein the first machine learning model includes a two-dimensional CNN.

Aspect 11: The method of aspect 10, wherein the 2D CNN extracts first one or more features from at least the portion of the first video in two spatial dimensions.

Aspect 12: The method of any one of aspects 1 to 11, wherein the first machine learning model includes a three-dimensional (3D) CNN.

Aspect 13: The method of aspect 12, wherein the 3D CNN extracts first one or more features from at least the portion of the first video in two spatial dimensions and a temporal dimension.

Aspect 14: The method of any one of aspects 1 to 13, further comprising: obtaining a second video; determining, using the machine learning model decision engine, a second machine learning model from a set of machine learning models, the second machine learning model being determined based on one or more characteristics of at least a portion of the second video; and processing at least the portion of the second video using the second machine learning model.

Aspect 15: The method of any one of aspects 1 to 14, further comprising: extracting, using the first machine learning model, first one or more features from at least the portion of the first video in parallel with determining the first machine learning model from the set of machine learning models to use for processing at least the portion of the first video. In some cases, the machine learning model decision engine shares a common neural network with the first machine learning model.

Aspect 16: The method of any one of aspects 1 to 15, wherein the one or more characteristics of at least the portion of the first video includes spatial and temporal characteristics.

Aspect 17: The method of any one of aspects 1 to 16, wherein the one or more characteristics of at least the portion of the first video includes audio characteristics.

Aspect 18: An apparatus for processing video data, comprising: a memory; and one or more processors coupled to the memory, the one or more processors configured to: obtain a first video; determine, using a machine learning model decision engine, a first machine learning model from a set of machine learning models (e.g., to use for processing at least a portion of the first video), the first machine learning model being determined based on one or more characteristics of at least a portion of the first video; and process at least the portion of the first video using the first machine learning model.

Aspect 19: The apparatus of aspect 18, wherein the one or more processors are configured to: determine a classification of at least the portion of the first video based on processing at least the portion of the first video using the first machine learning model.

Aspect 20: The apparatus of aspect 19 or 20, wherein the one or more processors are configured to: extract, using the first machine learning model, first one or more features from at least the portion of the first video; process, using a first supplemental model, the first one or more features; and determine, based on processing the first one or more features using the first supplemental model, a first classification of at least the portion of the first video.

Aspect 21: The apparatus of aspect 20, wherein: the first supplemental model includes a one-dimensional convolutional neural network; the first one or more features includes a first feature vector based on a first frame of at least the portion of the first video and a second feature vector based on a second frame of at least the portion of the first video; and the first supplemental model generates temporal information of at least the portion of the first video from at least the first feature vector and the second feature vector.

Aspect 22: The apparatus of any one of aspects 20 or 21, wherein the first supplemental model includes a multi-layer perceptron.

Aspect 23: The apparatus of any one of aspects 20 to 22, wherein the first supplemental model includes a graph convolutional network.

Aspect 24: The apparatus of any one of aspects 20 to 23, wherein the first supplemental model includes a non-local model.

Aspect 25: The apparatus of any one of aspects 18 to 24, wherein the one or more processors are configured to: determine, using the machine learning model decision engine, a second machine learning model from the set of machine learning models, the second machine learning model being determined based on one or more characteristics of at least another portion of the first video; and process the at least another portion of the first video using the second machine learning model.

Aspect 26: The apparatus of aspect 25, wherein the one or more processors are configured to: extract, using the second machine learning model, second one or more features from the at least another portion of the first video; process, using a second supplemental model, the second one or more features; and determine, based on processing the second one or more features using the second supplemental model, a second classification of the at least another portion of the first video.

Aspect 27: The apparatus of any one of aspects 18 to 26, wherein the first machine learning model includes a two-dimensional CNN.

Aspect 28: The apparatus of aspect 27, wherein the 2D CNN extracts first one or more features from at least the portion of the first video in two spatial dimensions.

Aspect 29: The apparatus of any one of aspects 18 to 28, wherein the first machine learning model includes a three-dimensional (3D) CNN.

Aspect 30: The apparatus of aspect 29, wherein the 3D CNN extracts first one or more features from at least the portion of the first video in two spatial dimensions and a temporal dimension Aspect 31: The apparatus of any one of aspects 18 to 30, wherein the one or more processors are configured to: obtain a second video; determine, using the machine learning model decision engine, a second machine learning model from a set of machine learning models, the second machine learning model being determined based on one or more characteristics of at least a portion of the second video; and process at least the portion of the second video using the second machine learning model.

Aspect 32: The apparatus of any one of aspects 18 to 31, wherein the machine learning model decision engine shares a common neural network with the first machine learning model, and wherein the one or more processors are configured to: extract, using the first machine learning model, first one or more features from at least the portion of the first video in parallel with determining the first machine learning model from the set of machine learning models to use for processing at least the portion of the first video.

Aspect 33: The apparatus of any one of aspects 18 to 32, wherein the one or more characteristics of at least the portion of the first video includes spatial and temporal characteristics.

Aspect 34: The apparatus of any one of aspects 18 to 33, wherein the one or more characteristics of at least the portion of the first video includes audio characteristics.

Aspect 35: A non-transitory computer-readable storage medium having stored thereon instructions which, when executed by one or more processors, cause the one or more processors to perform any of the operations of aspects 1 to 34.

Aspect 36: An apparatus comprising means for performing any of the operations of aspects 1 to 34.

What is claimed is:

1. An apparatus for processing video data, comprising:
a memory; and
one or more processors coupled to the memory, the one or more processors configured to:
   obtain a first video;
   extract, using a machine learning model decision engine, a first plurality of features based on at least a portion of the first video;
   determine, based on the first plurality of features, using the machine learning model decision engine, a first machine learning model from a set of machine learning models comprising at least the first machine learning model and a second machine learning model, the first machine learning model having a different neural network architecture than the second machine learning model, the first machine learning model being determined based on one or more characteristics of the first plurality of features;
   extract, using the first machine learning model, a second plurality of features based on at least the portion of the first video, wherein the second plurality of features comprises a first feature extracted from a first frame of the portion of the first video and a second feature extracted from a second frame of the portion of the first video, wherein the second frame is different from the first frame; and
   process the second plurality of features.

2. The apparatus of claim 1, wherein the one or more processors are configured to:
determine a classification of at least the portion of the first video based on processing the second plurality of features.

3. The apparatus of claim 1, wherein the one or more processors are configured to:
process, using a first supplemental model, the second plurality of features; and
determine, based on processing the second plurality of features using the first supplemental model, a first classification of at least the portion of the first video.

4. The apparatus of claim 3, wherein:
the first supplemental model includes a one-dimensional convolutional neural network (CNN);
the second plurality of features includes a first feature vector based on a first frame of at least the portion of the first video and a second feature vector based on a second frame of at least the portion of the first video; and
the first supplemental model generates temporal information of at least the portion of the first video from at least the first feature vector and the second feature vector.

5. The apparatus of claim 3, wherein the first supplemental model includes a multi-layer perceptron.

6. The apparatus of claim 3, wherein the first supplemental model includes a graph convolutional network.

7. The apparatus of claim 3, wherein the first supplemental model includes a non-local model.

8. The apparatus of claim 1, wherein the one or more processors are configured to:
extract, using the machine learning model decision engine, a third plurality of features based on at least another portion of the first video;
determine, based on the third plurality of features, using the machine learning model decision engine, the second machine learning model from the set of machine learning models, the second machine learning model being determined based on one or more characteristics of the third plurality of features;
extract, using the second machine learning model, a fourth plurality of features based on the at least another portion of the first video; and
process the fourth plurality of features.

9. The apparatus of claim 8, wherein the one or more processors are configured to:
process, using a supplemental model, the fourth plurality of features; and
determine, based on processing the fourth plurality of features using the supplemental model, a second classification of the at least another portion of the first video.

10. The apparatus of claim 1, wherein the first machine learning model includes a two-dimensional (2D) CNN.

11. The apparatus of claim 10, wherein the 2D CNN extracts first one or more features from at least the portion of the first video in two spatial dimensions.

12. The apparatus of claim 1, wherein the first machine learning model includes a three-dimensional (3D) CNN.

13. The apparatus of claim 12, wherein the 3D CNN extracts first one or more features from at least the portion of the first video in two spatial dimensions and a temporal dimension.

14. The apparatus of claim 1, wherein the one or more processors are configured to:
obtain a second video;
extract, using the machine learning model decision engine, a third plurality of features based on at least a portion of the second video;
determine, based on the third plurality of features, using the machine learning model decision engine, a third machine learning model from the set of machine learning models, the third machine learning model having a different architecture from the first machine learning model and the second machine learning model, the third machine learning model being determined based on one or more characteristics of the third plurality of features;
extract, using the third machine learning model, a fourth plurality of features based on at least the portion of the second video; and
process the fourth plurality of features.

15. The apparatus of claim 1, wherein the machine learning model decision engine shares a common neural network architecture with the first machine learning model, and wherein the one or more processors are configured to:
extract, using the first machine learning model, second plurality of features from at least the portion of the first video in parallel with determining the first machine learning model from the set of machine learning models to use for processing at least the portion of the first video.

16. The apparatus of claim 1, wherein the one or more characteristics of the first plurality of features includes spatial and temporal characteristics.

17. The apparatus of claim 1, wherein the one or more characteristics of at least the portion of the first video includes audio characteristics.

18. A method of processing video data, the method comprising:

obtaining a first video;

extracting, using a machine learning model decision engine, a first plurality of features based on at least a portion of the first video;

determining, based on the first plurality of features, using the machine learning model decision engine, a first machine learning model from a set of machine learning models comprising at least the first machine learning model and a second machine learning model, the first machine learning model having a different neural network architecture than the second machine learning model, the first machine learning model being determined based on one or more characteristics of the first plurality of features;

extracting, using the first machine learning model, a second plurality of features based on at least the portion of the first video, wherein the second plurality of features comprises a first feature extracted from a first frame of the portion of the first video and a second feature extracted from a second frame of the portion of the first video, wherein the second frame is different from the first frame; and processing the second plurality of features.

19. The method of claim 18, further comprising determining a classification of at least the portion of the first video based on processing the second plurality of features.

20. The method of claim 18, further comprising:

processing, using a first supplemental model, the second plurality of features; and determining, based on processing the second plurality of features using the first supplemental model, a first classification of at least the portion of the first video.

21. The method of claim 20, wherein:

the first supplemental model includes a one-dimensional CNN;

the second plurality of features includes a first feature vector based on a first frame of the first video and a second feature vector based on a second frame of the first video; and the first supplemental model generates temporal information of at least the portion of the first video from at least the first feature vector and the second feature vector.

22. The method of claim 18, further comprising:

extracting, using the machine learning model decision engine, a third plurality of features based on at least another portion of the first video;

determining, based on the third plurality of features, using the machine learning model decision engine, the second machine learning model from the set of machine learning models, the second machine learning model being determined based on one or more characteristics of the third plurality of features;

extracting, using the second machine learning model, a fourth plurality of features based on the at least another portion of the first video; and processing the fourth plurality of features.

23. The method of claim 22, further comprising:

processing, using a supplemental model, the fourth plurality of features; and determining, based on processing the fourth plurality of features using the supplemental model, a second classification of the at least another portion of the first video.

24. The method of claim 18, further comprising extracting, using the first machine learning model, the second plurality of features from at least the portion of the first video in parallel with determining the first machine learning model from the set of machine learning models to use for processing at least the portion of the first video, wherein the machine learning model decision engine shares a common neural network architecture with the first machine learning model.

25. The method of claim 18, wherein the first machine learning model includes a 2D CNN.

26. The method of claim 25, wherein the 2D CNN extracts first one or more features from at least the portion of the first video in two spatial dimensions.

27. The method of claim 18, wherein the first machine learning model includes a 3D CNN.

28. The method of claim 18, further comprising:

obtaining a second video;

extracting, using the machine learning model decision engine, a third plurality of features based on at least a portion of the second video;

determining, based on the third plurality of features, using the machine learning model decision engine, a third machine learning model from the set of machine learning models, the third machine learning model being determined based on one or more characteristics of the third plurality of features;

extracting, using the third machine learning model, a fourth plurality of features based on at least the portion of the second video; and processing the fourth plurality of features.

29. The method of claim 18, wherein the one or more characteristics of the first plurality of features includes spatial and temporal characteristics.

30. The method of claim 18, wherein the one or more characteristics of the first plurality of features includes audio characteristics.

* * * * *